(12) United States Patent
Zhu et al.

(10) Patent No.: US 11,491,593 B2
(45) Date of Patent: Nov. 8, 2022

(54) METHODS AND APPARATUSES FOR ASSEMBLING RADIATING STRUCTURES FOR A BASE STATION ANTENNA

(71) Applicant: CommScope Technologies LLC, Hickory, NC (US)

(72) Inventors: Xiaoguang Zhu, Frisco, TX (US); Kyle M. Walsh, Richardson, TX (US)

(73) Assignee: CommScope Technologies LLC, Hickory, NC (US)

( * ) Notice: Subject to any disclaimer, the term of this patent is extended or adjusted under 35 U.S.C. 154(b) by 233 days.

(21) Appl. No.: 17/038,009

(22) Filed: Sep. 30, 2020

(65) Prior Publication Data

US 2021/0129276 A1 May 6, 2021

Related U.S. Application Data

(60) Provisional application No. 62/909,273, filed on Oct. 2, 2019.

(51) Int. Cl.
   *B23P 21/00* (2006.01)
   *B23K 37/047* (2006.01)
   *B23Q 7/14* (2006.01)

(52) U.S. Cl.
   CPC .......... *B23P 21/004* (2013.01); *B23K 37/047* (2013.01); *B23Q 7/1426* (2013.01); *B23P 2700/50* (2013.01)

(58) Field of Classification Search
   CPC .............................. B23P 21/004; B23K 37/047
   See application file for complete search history.

(56) References Cited

U.S. PATENT DOCUMENTS

6,161,749 A * 12/2000 Bastacky ............... B23K 3/087
                                                              228/49.5

* cited by examiner

*Primary Examiner* — Jason L Vaughan
*Assistant Examiner* — Amanda Kreiling
(74) *Attorney, Agent, or Firm* — Myers Bigel, P.A.

(57) ABSTRACT

A radiating structure assembly system includes a movable conveyor that supports fixtures. Work stations are spaced about the conveyor such that the fixtures are moved sequentially to position the fixtures at the plurality of work stations. A first work station includes a loading assembly for loading the radiating elements on the fixtures. A second work station includes a first automated vertical assembly machine for mounting a first printed circuit board to the radiating element. A third work station includes a second automated vertical assembly machine for mounting a second printed circuit board to the radiating element to create a dipole assembly. A holding device is movable with the conveyor aligns and supports the first and second printed circuit boards relative to the radiating element. A fourth work station includes an unloading assembly for removing the dipole assembly from the conveyor.

17 Claims, 19 Drawing Sheets

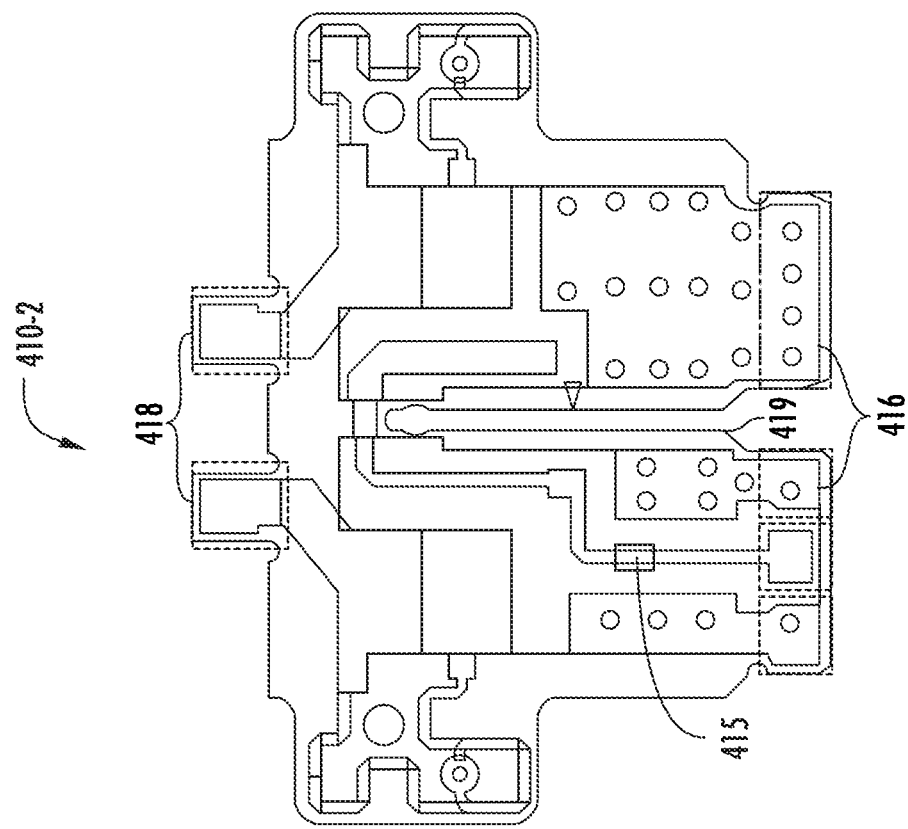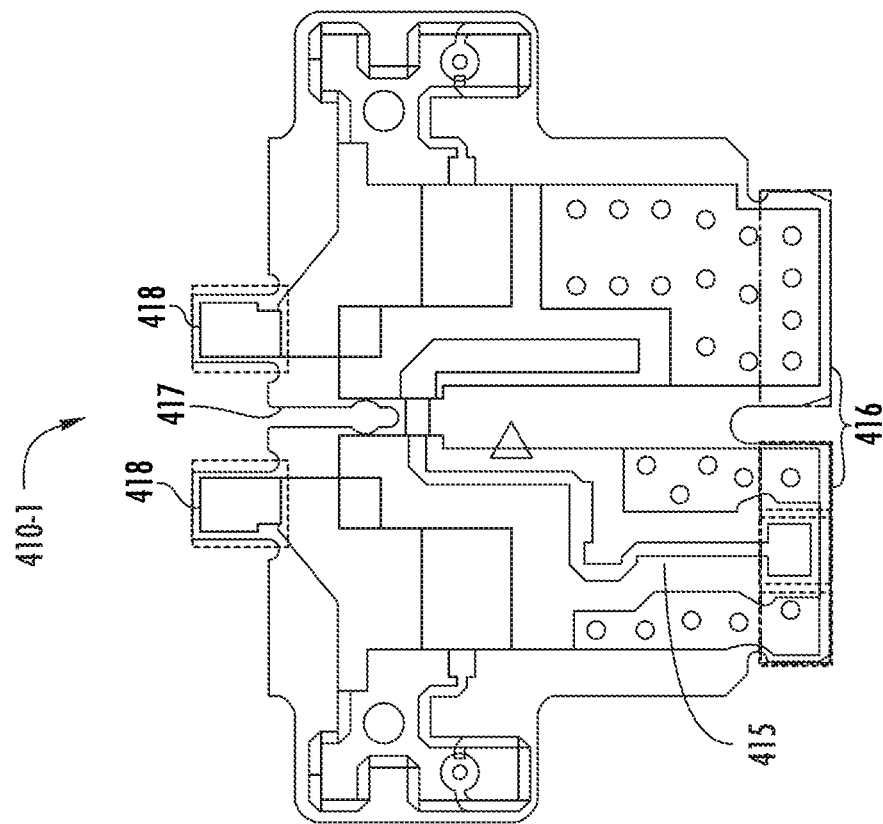
FIG. 5

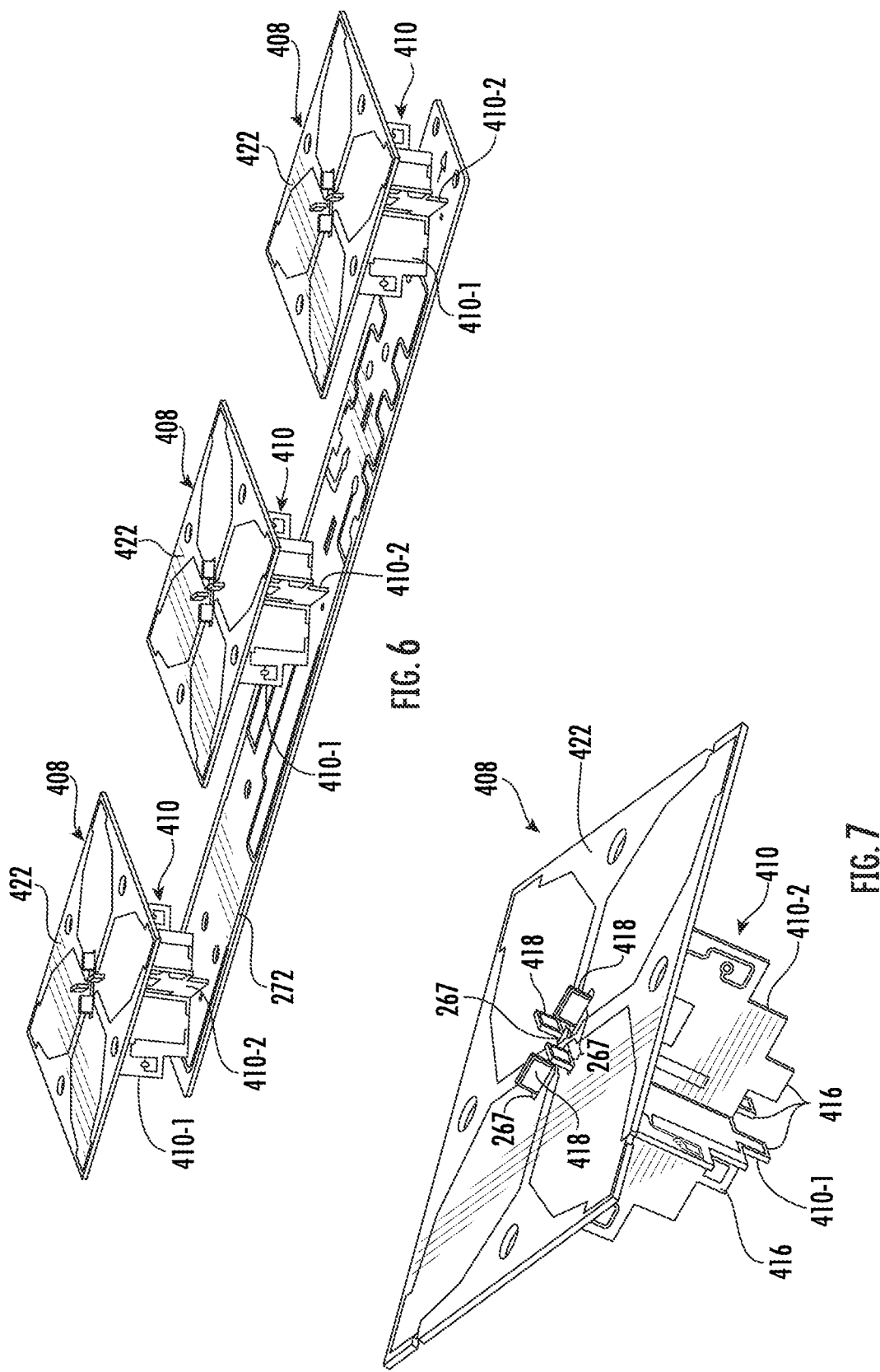

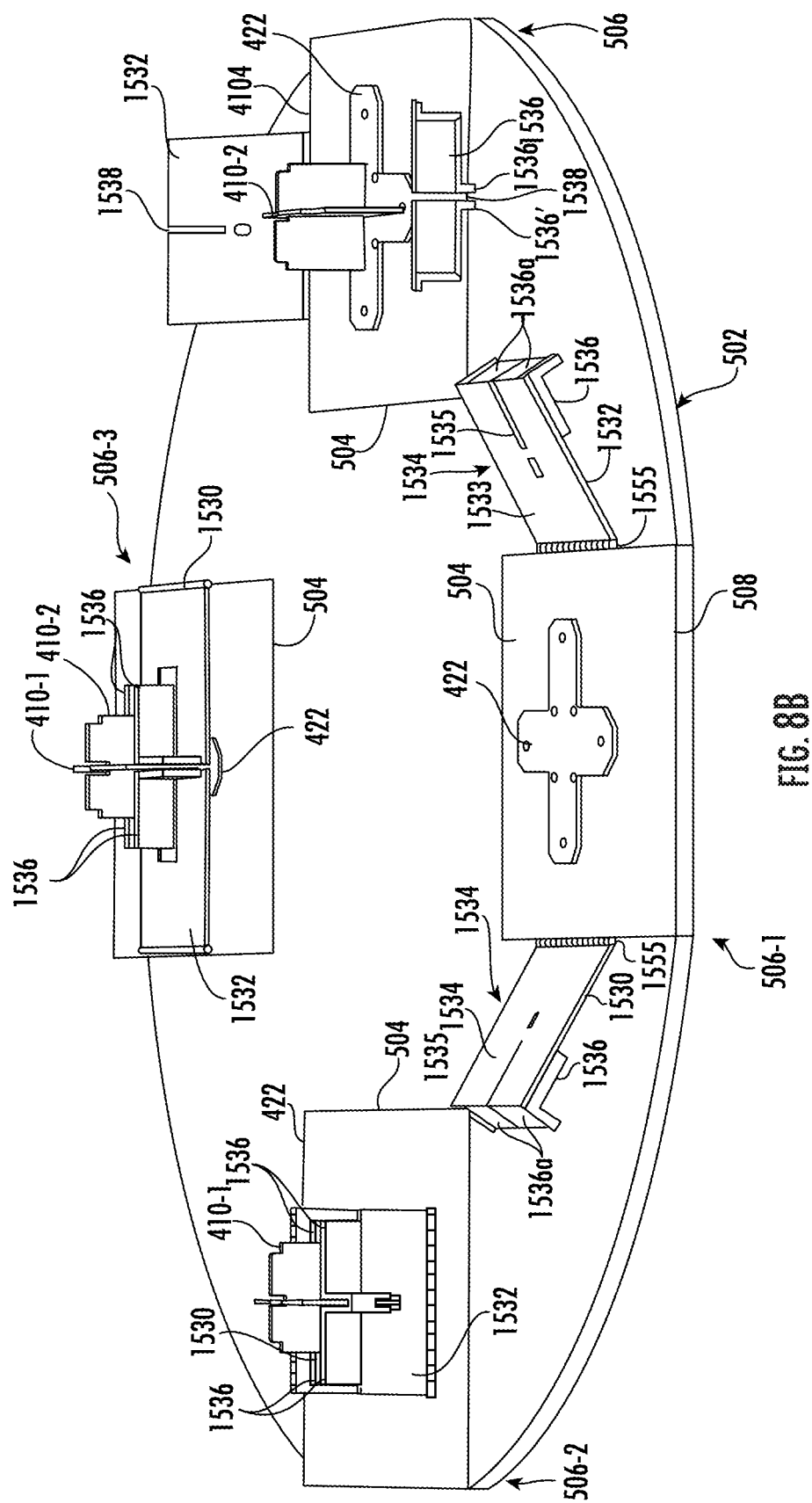

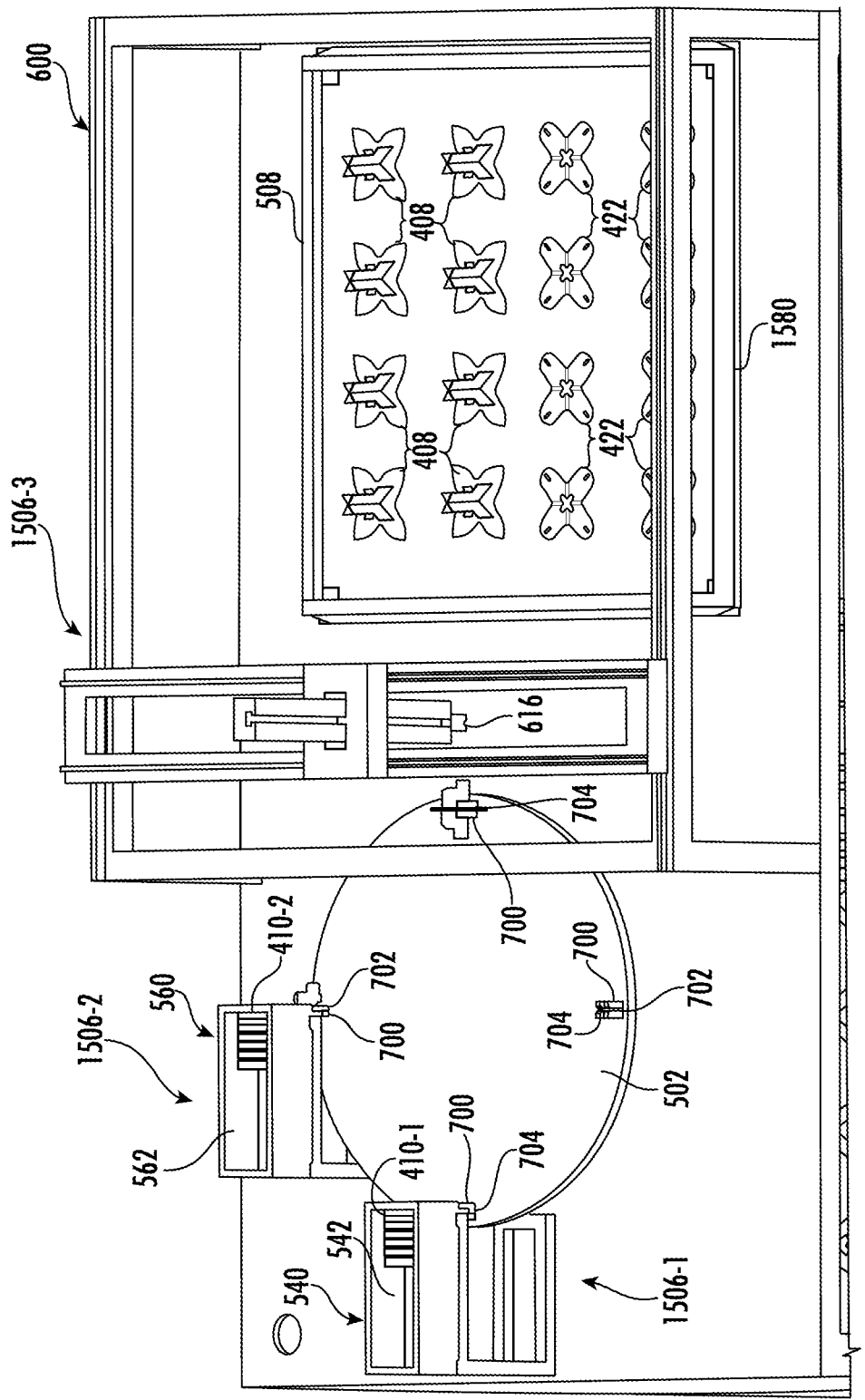

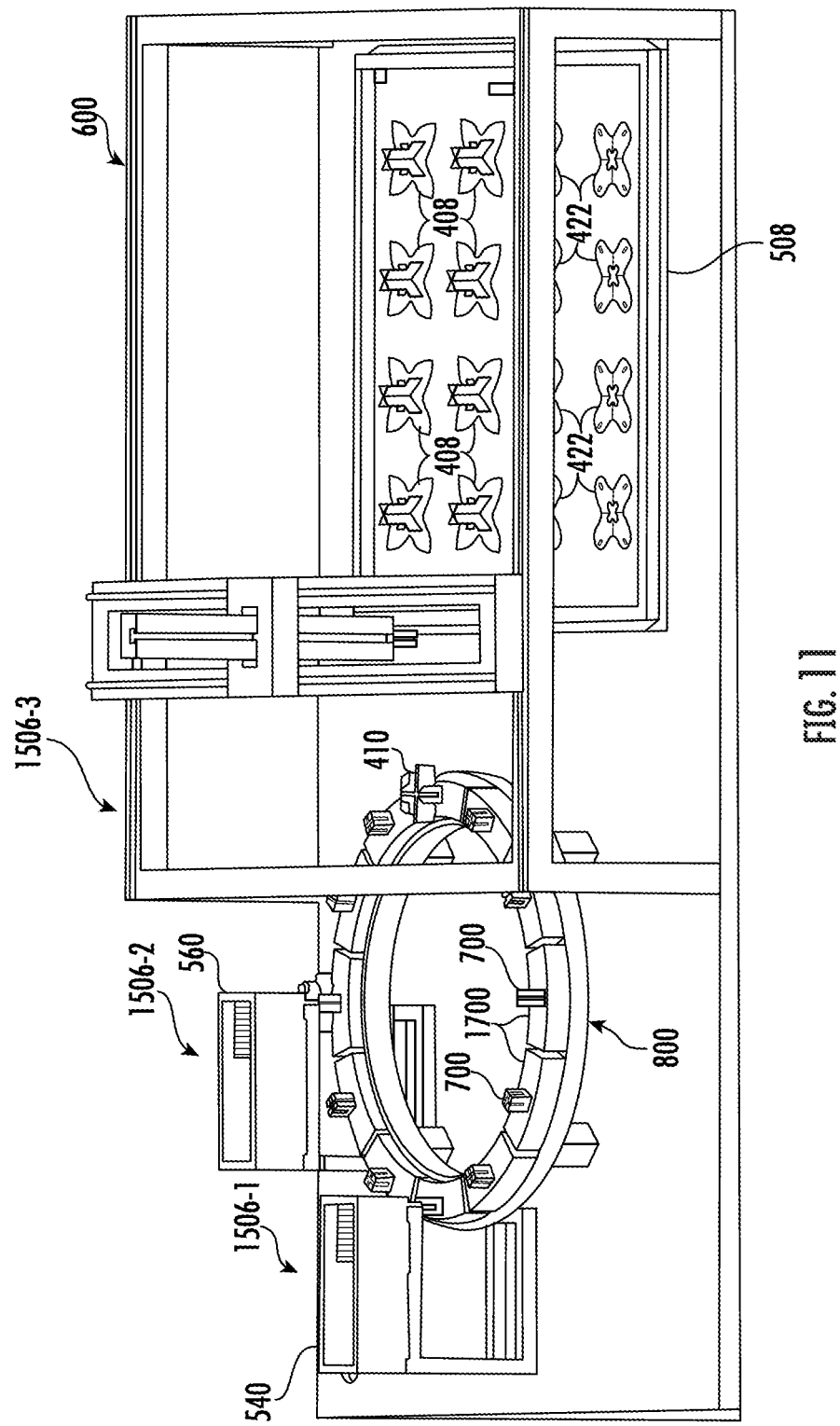

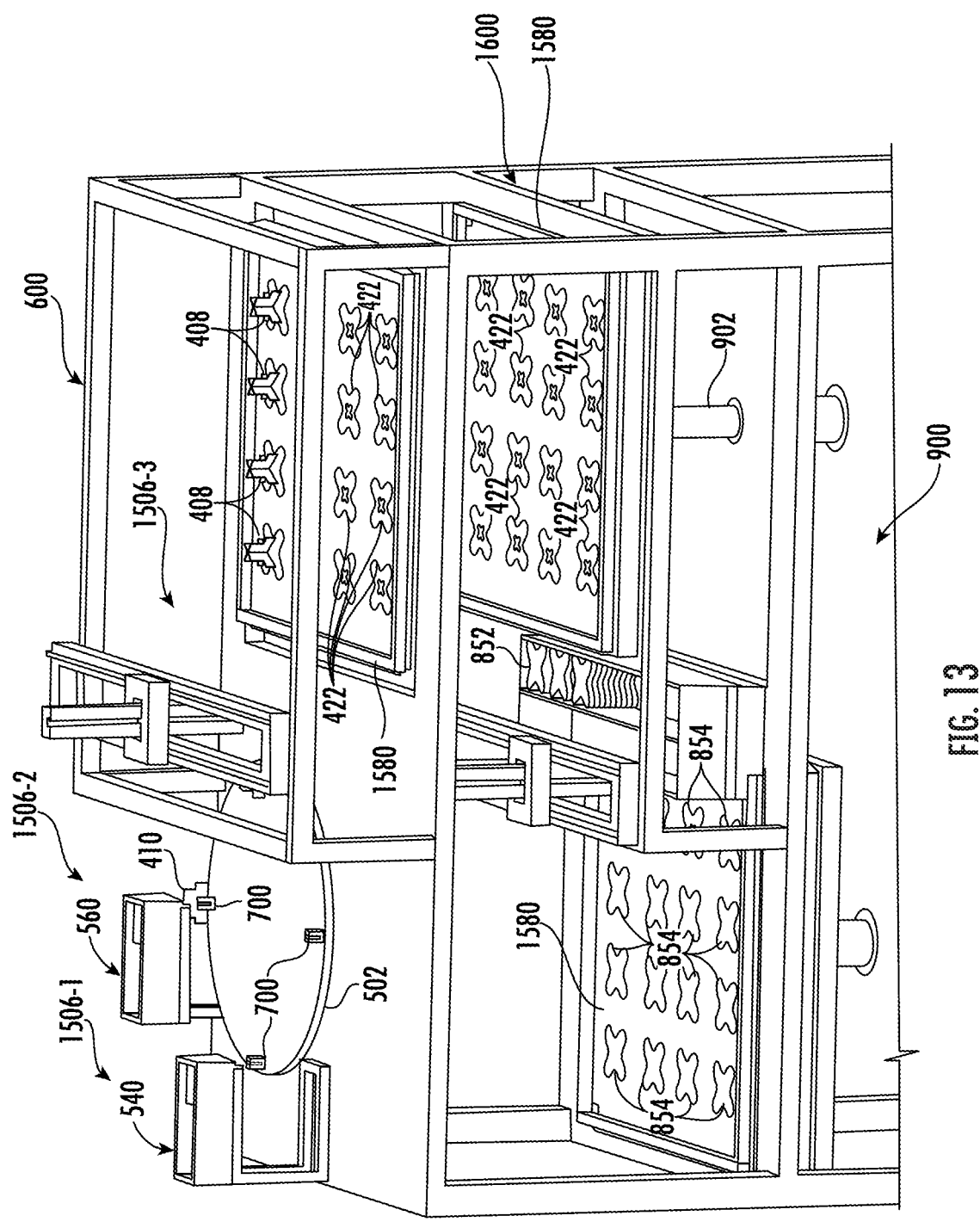

METHODS AND APPARATUSES FOR ASSEMBLING RADIATING STRUCTURES FOR A BASE STATION ANTENNA

CROSS-REFERENCE TO RELATED APPLICATION

The present application claims priority under 35 U.S.C. § 119 to U.S. Provisional Application Ser. No. 62/909,273, filed Oct. 2, 2019, the entire content of which is incorporated herein by reference.

BACKGROUND

The present invention generally relates to base station antennas and, more particularly, to methods and apparatuses for assembling radiating structures for such antennas.

Cellular communications systems are well known in the art. In a cellular communications system, a geographic area is divided into a series of regions that are referred to as "cells," and each cell is served by a base station. The base station may include one or more base station antennas that are configured to provide two-way radio frequency ("RF") communications with mobile subscribers that are geographically positioned within the cells served by the base station. In many cases, each base station provides service to multiple "sectors," and each of a plurality of antennas will provide coverage for a respective one of the sectors. Thousands of antennas are deployed in a typical cellular communication system where each antenna may comprise multiple radiating structures. The radiating structures are assembled manually. The manual assembly of the large number of radiating structures is labor intensive, time consuming and costly

SUMMARY OF THE INVENTION

In some embodiments, an apparatus for assembling a dipole assembly comprises a movable conveyor supporting a fixture where the fixture is configured for retaining a radiating element. A plurality of work stations are spaced about the conveyor. The conveyor is movable to sequentially position the fixture in a work position associated with each of the plurality of work stations. A first work station of the plurality of work stations comprises a loading device for loading a radiating element on the fixture. A holding device is movable with the conveyor. A second work station of the plurality of work stations comprises a first automated vertical assembly machine for mounting a first printed circuit board to the radiating element. The holding device aligns and supports the first printed circuit board relative to the radiating element. A third work station of the plurality of work stations comprises a second automated vertical assembly machine for mounting a second printed circuit board to the radiating element to create the dipole assembly. The holding device aligns and supports the second printed circuit board relative to the radiating element.

A fourth work station of the plurality of work stations may be provided that may comprise an unloading assembly for removing the dipole assembly from the fixture. The movable conveyor may comprise a rotating platform supporting four fixtures where each of the four fixtures is configured for retaining a radiating element. The four fixtures may be equally angularly spaced about the platform in some embodiments. The platform may be sequentially rotated about a vertical axis such that the each of the four fixtures is positionable at the first, second, third and fourth work stations. Each fixture may comprise a recess for retaining the radiating element. The loading device may comprise a loading arm that unloads the radiating element from a supply and loads the radiating element on a fixture.

The loading arm may comprise an end effector for engaging the radiating element. The holding device may comprise a first arm and a second arm that reciprocate toward and away from one another. The first arm and the second arm may reciprocate toward and away from one another along a common axis. The first arm and the second arm may move between a first, retracted position and a second, extended position where, in the second, extended position, the first arm and the second arm extend over the fixture. A component holder comprising a pair of retainers may be located at the distal end of each of the first arm and the second arm. The pair of retainers may be spaced from one another to create a vertically extending first channel configured to vertically receive the first printed circuit board. In the extended position, the pair of retainers on the first arm may be spaced from the pair of retainers on the second arm to create a second vertical channel configured to receive the second printed circuit board. The second channel may be disposed transversely to the first channel. The second work station of the plurality of work stations may comprise a supply of first printed circuit boards. The first automated vertical assembly machine may move the first printed circuit board vertically downward such that the first printed circuit board is inserted into the first channel. The first printed circuit board may comprise at least one projection that is received in at least one slot formed in the radiating element. The third work station of the plurality of work stations may comprise a supply of second printed circuit boards. The second automated vertical assembly machine may move the second printed circuit board vertically downward such that the second printed circuit board is inserted vertically into the second channel. The second printed circuit board may comprise at least one projection that is received in at least one slot formed in the radiating element. The second printed circuit board may be disposed transversely to the first printed circuit board. A soldering work station may be provided for soldering the first printed circuit board and the second printed circuit board to the radiating element. The conveyor may rotate the fixture 90 degrees between the second work station and the third work station. The first automated vertical assembly machine may be in the same orientation as the second automated vertical assembly machine. The unloading assembly may comprise an end effector movable along an x-direction, a y-direction and a z-direction. The end effector may be moved in the x-direction and the y-direction to be positioned over the dipole assembly at the fourth work station. The end effector may be extended in the z-direction to engage the dipole assembly. A storage device may be provided for receiving the dipole assembly from the unloading assembly. The unloading assembly may comprise a gantry system. The gantry system may comprise a first rail extending in the x-direction and supported on uprights so as to be positioned vertically above the conveyor with a first carriage riding on the first rail movable in the x-direction; the first carriage may comprise a second rail extending in the y-direction with a second carriage riding on the second rail movable in the y-direction; and the second carriage may support a vertically reciprocating arm movable in the z-direction where the vertically reciprocating arm supports the end effector. A control system may control the operation of the conveyors, the first workstation, the second work station and the third work station.

In some embodiments, an apparatus for assembling a device comprises a movable platform supporting a fixture where the fixture is configured for retaining a base component. A plurality of work stations are spaced about the platform. The platform is movable to sequentially position the fixture in a work position relative to each of the plurality of work stations. A first work station of the plurality of work stations comprises a loading device for loading a base component on the fixture. A holding device is movable with the platform. A second work station of the plurality of work stations comprises a first automated vertical assembly machine for mounting a first component to the base component. The holding device aligns and supports the first component relative to the base component. A third work station of the plurality of work stations comprises a second automated vertical assembly machine for mounting a second component to the base component. The holding device aligns and supports the second component relative to the base component. The platform rotates the fixture 90 degrees between the second work station and the third work station and the first automated vertical assembly machine is in the same orientation as the second automated vertical assembly machine.

In some embodiments, an apparatus for assembling a dipole assembly comprises a movable conveyor supporting a fixture. The fixture is configured for retaining a first printed circuit board and a second printed circuit board. A plurality of work stations are spaced about the conveyor where the conveyor is movable to sequentially position the fixture relative to the plurality of work stations. A first work station of the plurality of work stations comprises a first automated vertical assembly machine for loading the first printed circuit board onto the fixture. A second work station of the plurality of work stations comprises a second automated vertical assembly machine for loading a second printed circuit board onto the fixture to create a dipole subassembly. A third work station of the plurality of work stations comprises an unloading device for removing the dipole subassembly from the conveyor and for mounting the dipole subassembly to a radiating element.

The fixture may comprise a block comprising a first slot and a second slot where the first slot may be configured to receive the first printed circuit board and the second slot may be configured to receive the second printed circuit board. The first slot may be arranged perpendicularly relative to the second slot. The radiating element may be held in a storage device. The unloading device may comprise an end effector movable along an x-direction, a y-direction and a z-direction. The end effector may be moved in the x-direction and y-direction to be positioned over the dipole subassembly at the fourth work station. The end effector may be extended in the z-direction to engage the dipole subassembly. The unloading device may comprise a gantry system that may comprise a first rail extending in the x-direction and supported on uprights so as to be positioned vertically above the conveyor and a first carriage may ride on the first rail movable in the x-direction; the first carriage may comprise a second rail extending in the y-direction and a second carriage may ride on the second rail movable in the y-direction; the second carriage may support a vertically reciprocating arm movable in the z-direction; and the vertically reciprocating arm may support the end effector. The unloading device may move the dipole subassembly vertically onto the radiating element to insert projections on the dipole subassembly into the mating slots on the radiating element. A second gantry system may load the radiating element onto the storage device. The storage device may be moved horizontally from the second gantry system to the gantry system. The storage device may be moved vertically from the second gantry system to the gantry system.

In some embodiments, a method of assembling a dipole assembly comprises: moving a fixture to a work position at a first work station; loading a radiating element onto the fixture by a loading device at the first work station; moving the fixture to a work position at a second work station; mounting a first printed circuit board to the radiating element by a first automated vertical assembly machine at the second work station; moving the fixture to a work position at a third work station; mounting a second printed circuit board to the radiating element by a second automated vertical assembly machine at the third work station; unloading the dipole assembly from the fixture by an unloading device.

In some embodiments, a method of assembling a dipole assembly comprises: moving a fixture to a work position at a first work station; mounting a first printed circuit board to the fixture by a first automated vertical assembly machine at the first work station; moving the fixture to a work position at a second work station; mounting a second printed circuit board to the fixture by a second automated vertical assembly machine at the second work station to create a feed stalk; moving the fixture to a work position at a third work station; loading a radiating element onto a holder; unloading the feed stalk from the fixture by an unloading device at the third work station and mounting the feed stalk to the radiating element by the unloading device.

BRIEF DESCRIPTION OF THE DRAWINGS

FIG. 5 is a side view of the printed circuit boards used to form the feed stalks for the high band radiating elements included in the dipole-to-feed board assembly of FIGS. 4A-4D.

FIG. 6 is a perspective view of an embodiment of three dipole assemblies mounted on a feed board.

FIG. 7 is a perspective view of an embodiment of a dipole assembly.

FIG. 8B is a perspective view of another embodiment of a portion of the assembly apparatus for a dipole assembly.

FIG. 10 is a perspective view of another embodiment of an assembly apparatus for a dipole assembly.

FIG. 11 is a perspective view of yet another embodiment of an assembly apparatus for a dipole assembly.

FIG. 12 is a perspective view of still another embodiment of an assembly apparatus for a dipole assembly.

FIG. 13 is a perspective view of yet another embodiment of an assembly apparatus for a dipole assembly.

DETAILED DESCRIPTION

Pursuant to embodiments of the present invention, methods and apparatuses for the automated assembly of antenna components are provided. Base station antennas may be used in a wide variety of different applications. Base station antennas may have widely varying requirements in terms of the frequencies at which the antennas operate, the number of frequency bands supported by the antenna, the azimuth and elevation beamwidths, the overall dimensions of the antenna and the like. As such, it may be necessary to develop and assemble a wide number of different antenna designs that have, for example, different sizes, different parts, different spacings between radiating elements, etc. The manual assembly of these components is costly and time consuming. The methods and apparatuses for the automated assembling of antenna components according to embodiments of the invention significantly lowers assembly time and costs.

Embodiments of the present invention will now be described in further detail with reference to the attached figures.

Figure 1:
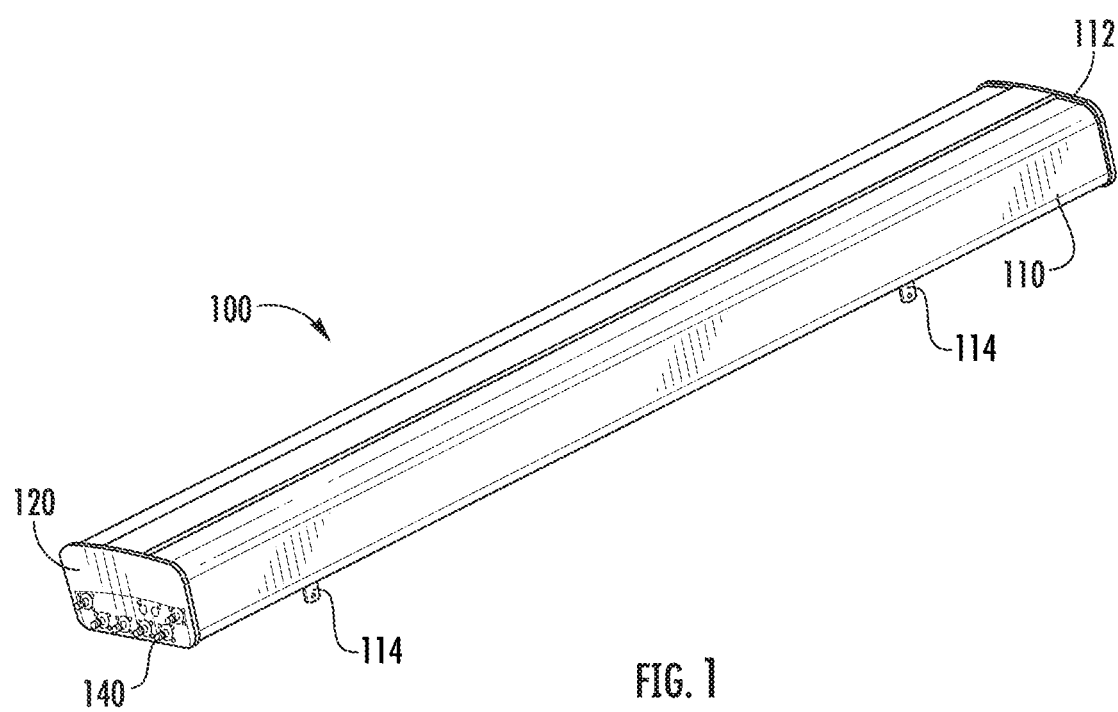
FIG. 1 is a front perspective view of an embodiment of a base station antenna.

FIG. 1 illustrates a base station antenna 100 according to certain embodiments of the present invention. As shown in FIG. 1, the antenna 100 is an elongated structure and has a generally rectangular shape. In an example embodiment, the width and depth of the antenna 100 may be fixed, while the length of the antenna 100 may be variable. The antenna 100 includes a radome 110 and a top end cap 112. A pair of mounting brackets 114 may be provided on the rear side of the radome 110 which may be used to mount the antenna 100 onto an antenna mount (not shown) on, for example, an antenna tower. The antenna 100 also includes a bottom end cap 120 which includes a plurality of connectors 140 mounted therein. The antenna 100 is typically mounted in a vertical configuration (i.e., the long side of the antenna 100 extend along a vertical axis with respect to the earth).

Figure 2A:
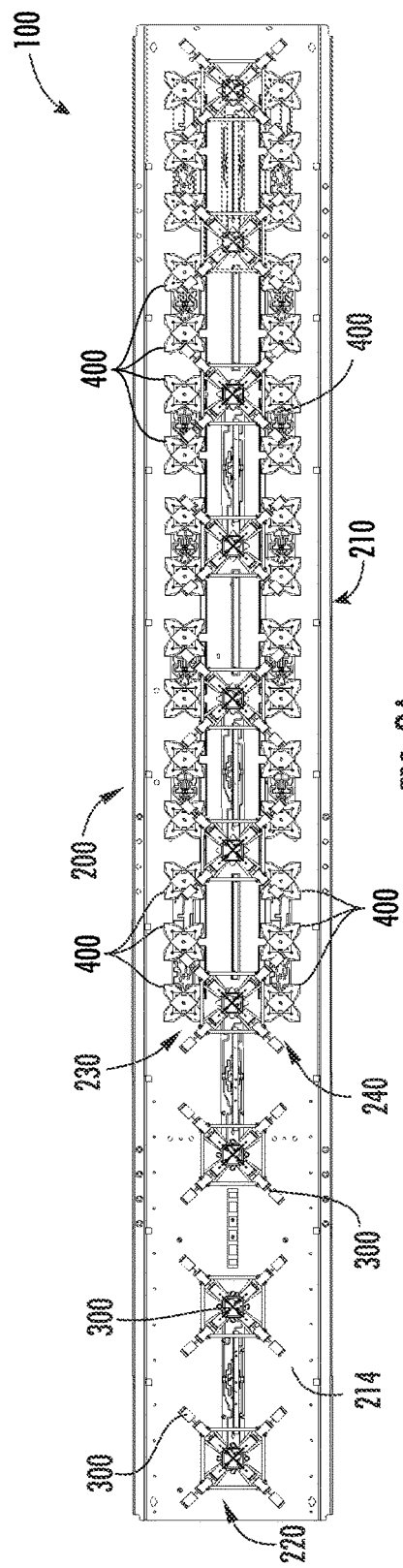
FIGS. 2A 2C are a front view, a side view, and a back view, respectively, of the base station antenna of FIG. 1 with the radome removed.
Figure 2B:
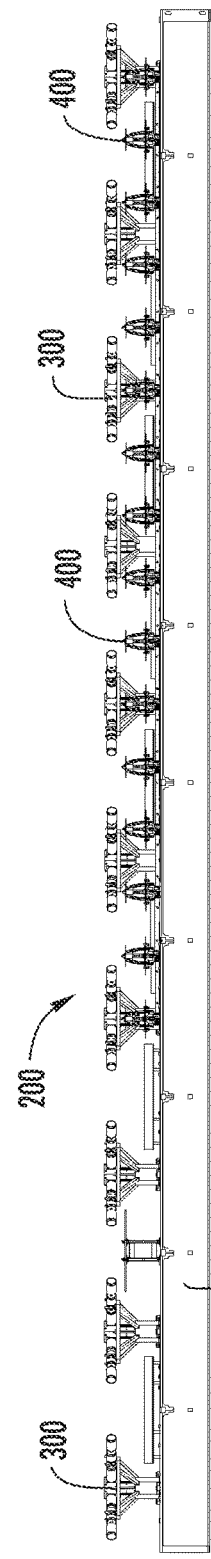
Figure 2C:
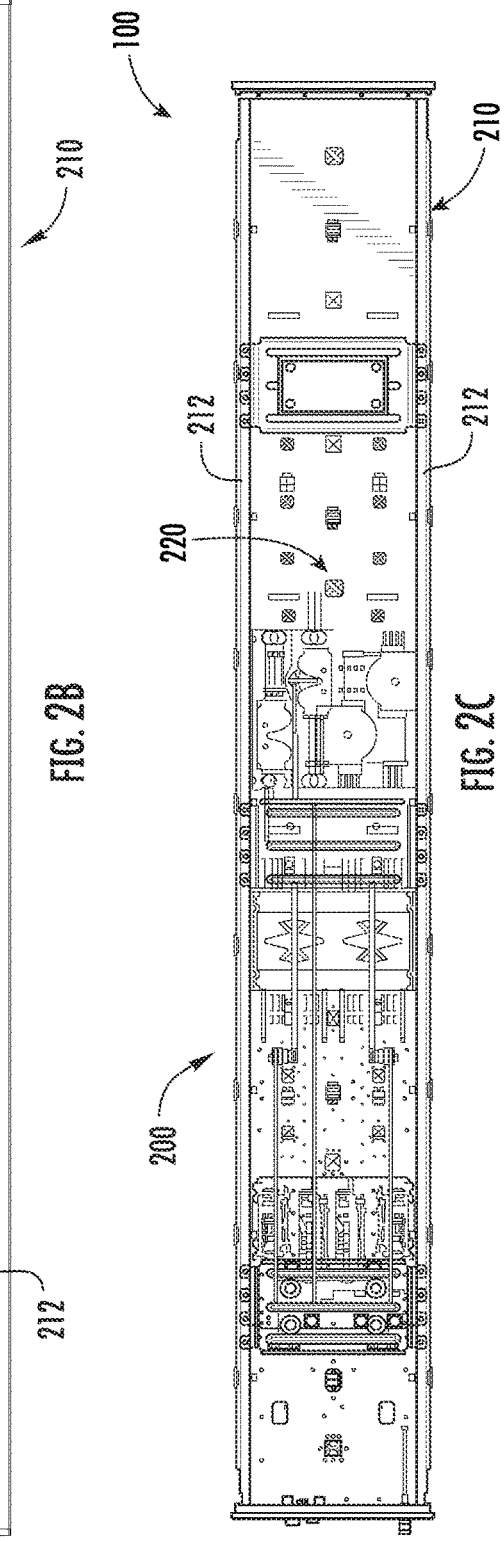

FIGS. 2A-2C are a front view, a side view, and a back view, respectively, of the base station antenna 100 of FIG. 1 with the radonie 110 thereof removed. The antenna 100 includes an antenna assembly 200 that includes a ground plane structure 210 that has sidewalls 212, which here include RF choke sections, and a reflector surface 214. Various mechanical and electronic components 220 of the antenna are mounted to the ground plane structure 210. These electronic and mechanical components include, among other things, phase shifters, remote electronic tilt ("RET") units, mechanical linkages, diplexers, and the like. The reflector surface 214 of the ground plane structure 210 may comprise or include a metallic surface that serves as a reflector and ground plane for the radiating elements of the antenna 100.

Figure 2:
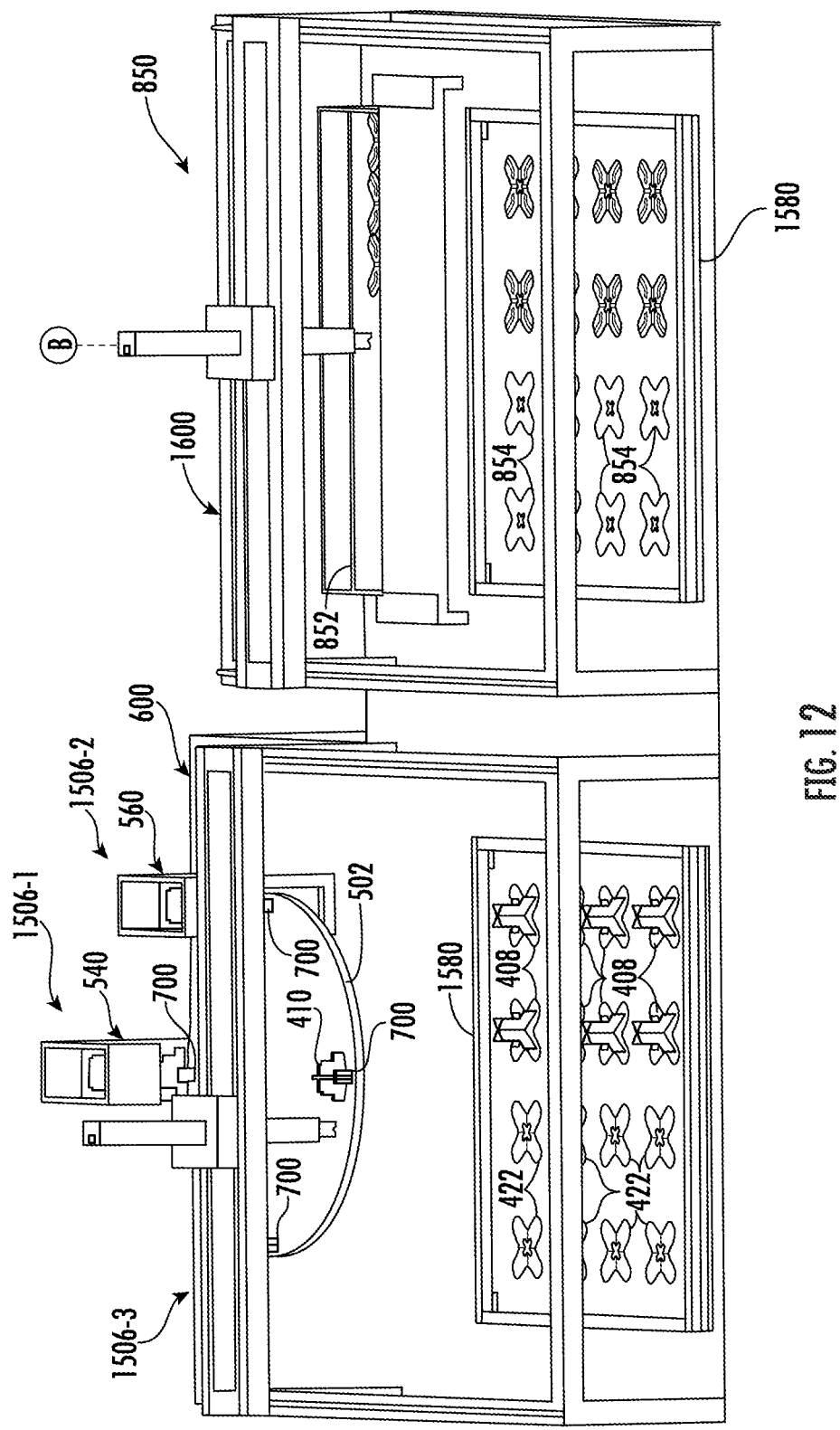

A plurality of radiating elements 300, 400 are mounted on the reflector surface 214 of the ground plane structure 210. The radiating elements 300, 400 include low band radiating elements 300 and high band radiating elements 400. The low band radiating elements 300 are mounted along a first vertical axis and may extend along the full length of the antenna 100 in some embodiments. The column of low band radiating elements 300 form an array 220 of low band radiating elements. The high band radiating elements 400 may be divided into groups that are mounted along respective second and third vertical axes with the first vertical axis (and the low band radiating elements 300) extending therebetween. The first column of high band radiating elements 400 may form a first array 230 of high band radiating elements, and the second column of high band radiating elements 400 may form a second array 240 of high band radiating elements. The low band radiating elements 300 may be configured to transmit and receive signals in a first frequency band. In some embodiments, the first frequency band may be a wide band and may comprise the 694-960 MHz frequency range. The high band radiating elements 400 may be configured to transmit and receive signals in a second frequency band. In some embodiments, the second frequency band may also be a wide band and may comprise the 1.695-2.690 GHz frequency range. As is evident from FIGS. 1 and 2 a large number of radiating elements 300, 400 may be found in a single antenna.

Figure 3:
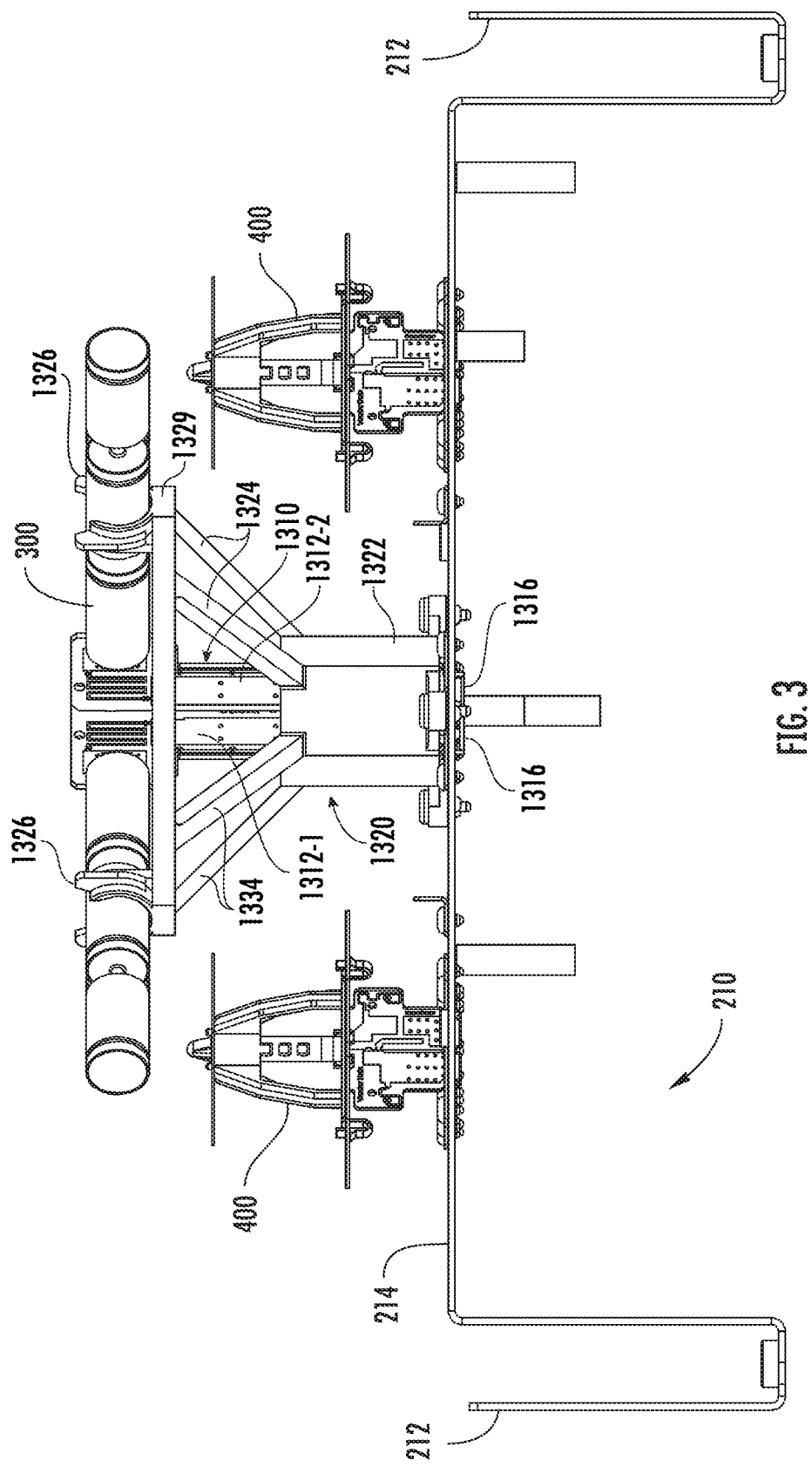
FIG. 3 is an end view of the base station antenna of FIG. 1 with the radome removed.
Figure 4A:
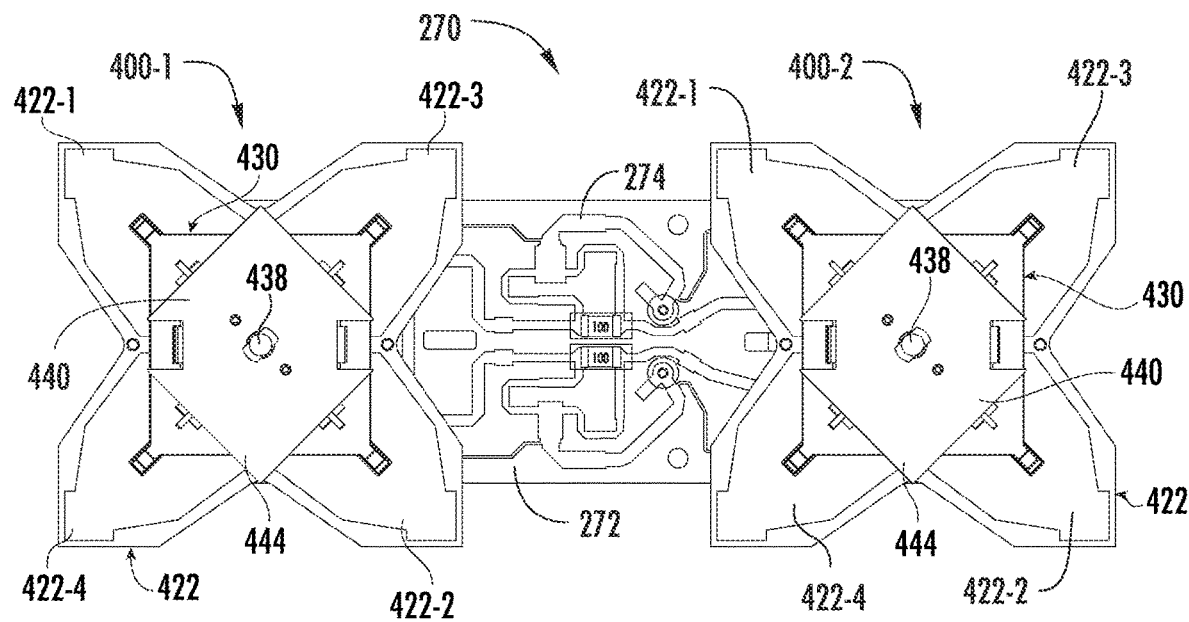
FIGS. 4A-4D are a top view, a side view, a bottom view and a perspective view of a dipole-to-feed board assembly of the antenna of FIG. 1 that includes two high band radiating elements.
Figure 4B:
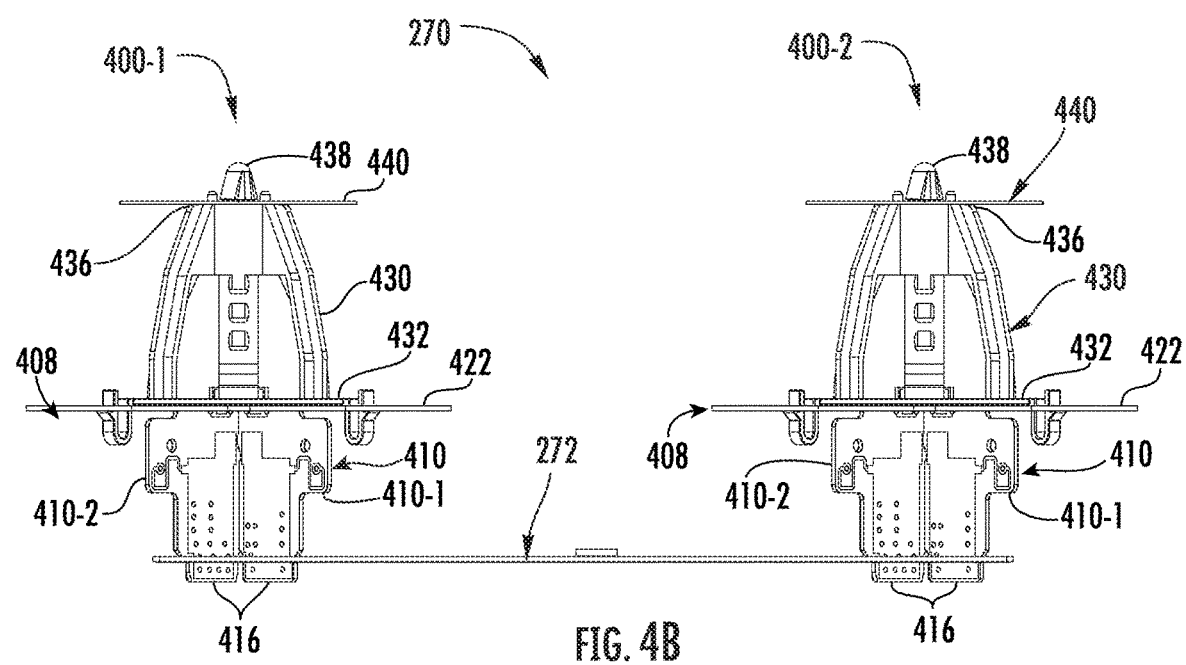
Figure 4D:
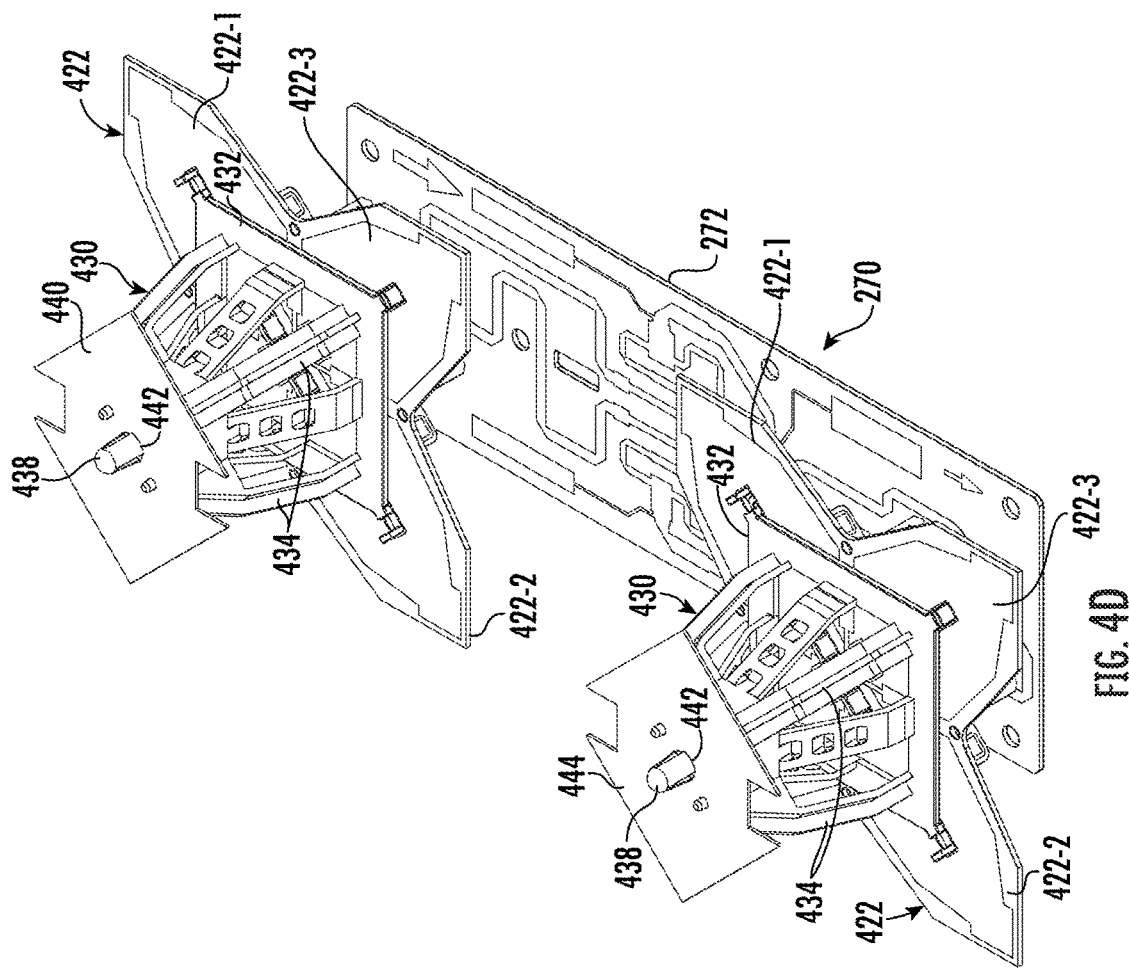
Figure 4C:
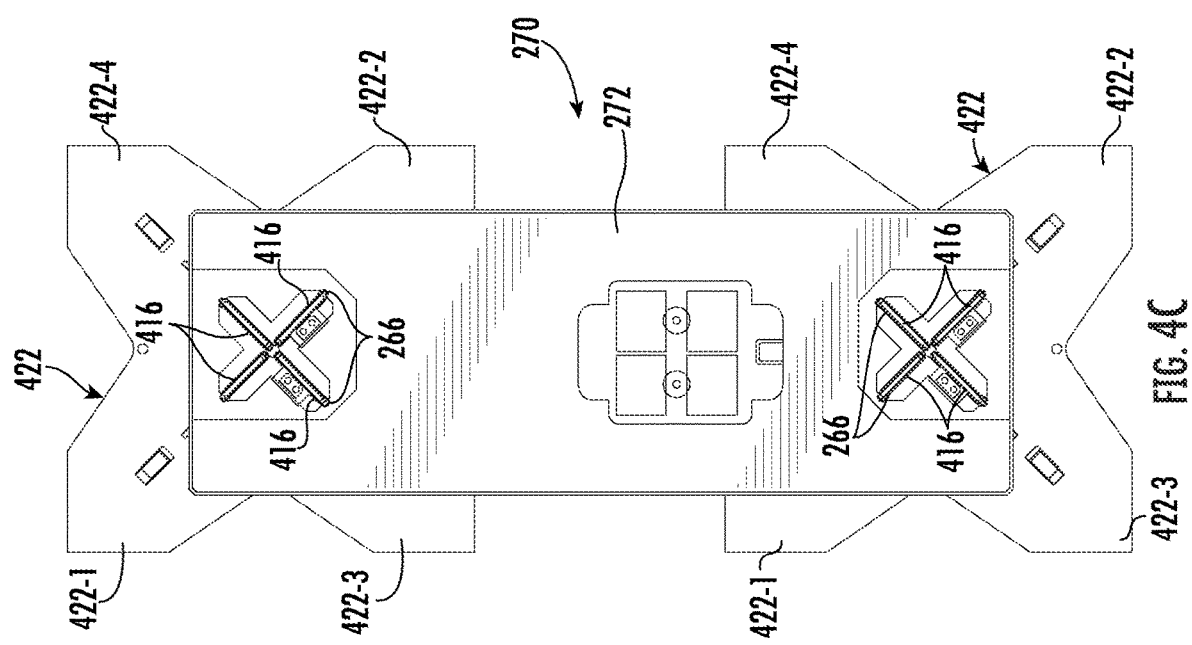

FIG. 3 is an enlarged end view of a portion of the antenna 100 with the radome 110 removed that illustrates one of the low band radiating elements 300 and two of the high band radiating elements 400 in greater detail. As shown in FIG. 3, the low band radiating elements 300 are taller (above the reflector 214) than the high band radiating elements 400 and extend over the high band radiating elements 400.

FIGS. 4A-4D are a top view, a side view, a bottom view and a perspective view, respectively, of a dipole-to-feed board assembly 270 of the antenna 100 of FIGS. 2A-2B that includes two high band radiating elements 400-1, 400-2 extending upwardly from a printed circuit board 272. The printed circuit board 272 includes RF transmission line feeds 274 that provide RF signals to, and receive RF signals from, the respective high band radiating elements 400-1 and 400-2. Each high band radiating element 400 includes a dipole assembly 408 (FIGS. 7 and 4B) comprising a feed stalk 410 and a dipole radiating element 422. Each high band radiating element 400 may also comprise a director support 430 and a director 440.

The feed stalks 410 may each comprise first and second printed circuit boards 410-1 and 410-2. As shown in FIG. 5, the printed circuit boards 410-1 and 410-2 have RF transmission line feeds 415 formed thereon that carry RF signals between the printed circuit board 272 and the dipole radiating elements 422. The printed circuit boards 410-1 and 410-2 may consist of a single substrate with conductive traces on both sides and containing some plated through holes. Each of the printed circuit boards 410-1 includes an upper slit 417 and each of the printed circuit boards 410-2 includes a lower slit 419 so that the first and second printed circuit boards 410-1 and 410-2 may be assembled together to form a vertically extending feed stalk 410 that is formed as a column having a generally x-shaped horizontal cross-section. Lower portions of each printed circuit board 410-1, 410-2 include lower plated projections 416. These lower plated projections 416 are inserted through slits 266 in the printed circuit board 272. The plated projections 416 may be soldered to plated portions on printed circuit board 272 that are adjacent the slits 266 to electrically and mechanically connect the printed circuit boards 410-1, 410-2 to the printed circuit board 272. Upper portions of each printed circuit board 410-1, 410-2 include upper plated projections 418. These upper plated projections 418 are inserted through slits 267 in the radiating element 422 (FIG. 7). The plated projections 418 may be soldered to plated portions on radiating element 422 that are adjacent the slits 267 to electrically and mechanically connect the printed circuit boards 410-1, 410-2 to the radiating element 422. The plated projections 416, 418 may facilitate the soldering of the printed circuit boards 410-1 and 410-2 using automated continuous wave soldering, selective wave soldering techniques or other similar techniques. Such automated continuous wave soldering or selective wave soldering techniques may decrease manufacturing costs and provide for more consistent and/or improved solder joints.

Each dipole radiating element 422 may comprise a printed circuit board having four plated sections 422-1, 422-2, 422-3 and 422-4 formed thereon that form the four dipole arms of a cross-dipole radiator. The four plated sections 422-1, 422-2, 422-3 and 422-4 are arranged in a general cruciform shape. Plated sections 422-1 and 422-2 together form a first radiating element. In the depicted embodiment, the first radiating element is designed to transmit signals having a +45 degree polarization. Plated sections 422-3 and 422-4 together form a second radiating element. In the depicted embodiment, the second radiating element is designed to transmit signals having a −45 degree polarization. The radiating elements 422 may be mounted approximately a quarter wavelength above the reflector 214 by the feed stalks 410.

Each director support 430 may comprise, for example, a plastic support that is mounted to, and extends upwardly from, a respective one of the dipole radiating elements 422. In the depicted embodiment, each director support 430 comprises a base 432 that clips onto mating features on the associated dipole radiating element 422. Arms 434 extend upwardly from the base 432 and join together to form an upper shelf 436. A clip 438 extends upwardly from the upper shelf 436 that clips onto mating features on the associated director 440.

The directors 440 are mounted on the respective director supports 430. Each director 440 comprises a flat metal plate. In the depicted embodiment, the directors 440 are cut into a "double arrow" shape. This shape may help make the radome 110 transparent to the high band radiating elements 400 and may also improve the dipole impedance match. Each director 440 includes a central aperture 442. The clip 438 of its respective director support 430 is inserted through this aperture 442 to mount the director 440 on its respective director support 430.

Referring to FIGS. 6 and 7, dipole assemblies 408 are shown comprising a feed stalk 410 comprised of printed circuit boards 410-1, 410-2 and the dipole radiating element 422. The upper plated projections 418 on the feed stalks 410 may be inserted into the slits 267 in the dipole radiating element 422 and soldered in place to complete the dipole assembly 408, as previously described. The dipole assemblies 408 may be mounted to a printed circuit board 272. The lower plated projections 416 on the feed stalks 410 may be inserted into the slits 266 in the printed circuit board 272 and soldered in place, as previously described. The director supports 430 may be mounted on the dipole radiating elements 420, and the directors 440 may be mounted on the respective director supports 430. It is noted that FIG. 6 shows three high band radiating elements mounted to board 272 while FIGS. 4A-4D show two high band radiating elements mounted to board 272 where the construction of the dipole assemblies 408 are slightly different.

Apparatuses and methods will be described for manufacturing the dipole assemblies and radiating elements used in base station antennas. The apparatuses and methods as set forth herein are described with respect to the dipole assemblies as described above; however, the assembly methods and apparatuses may be used with a variety of different types and sizes of dipole assemblies and the radiating elements and feed stalks may differ from those as specifically described herein.

Figure 8A:
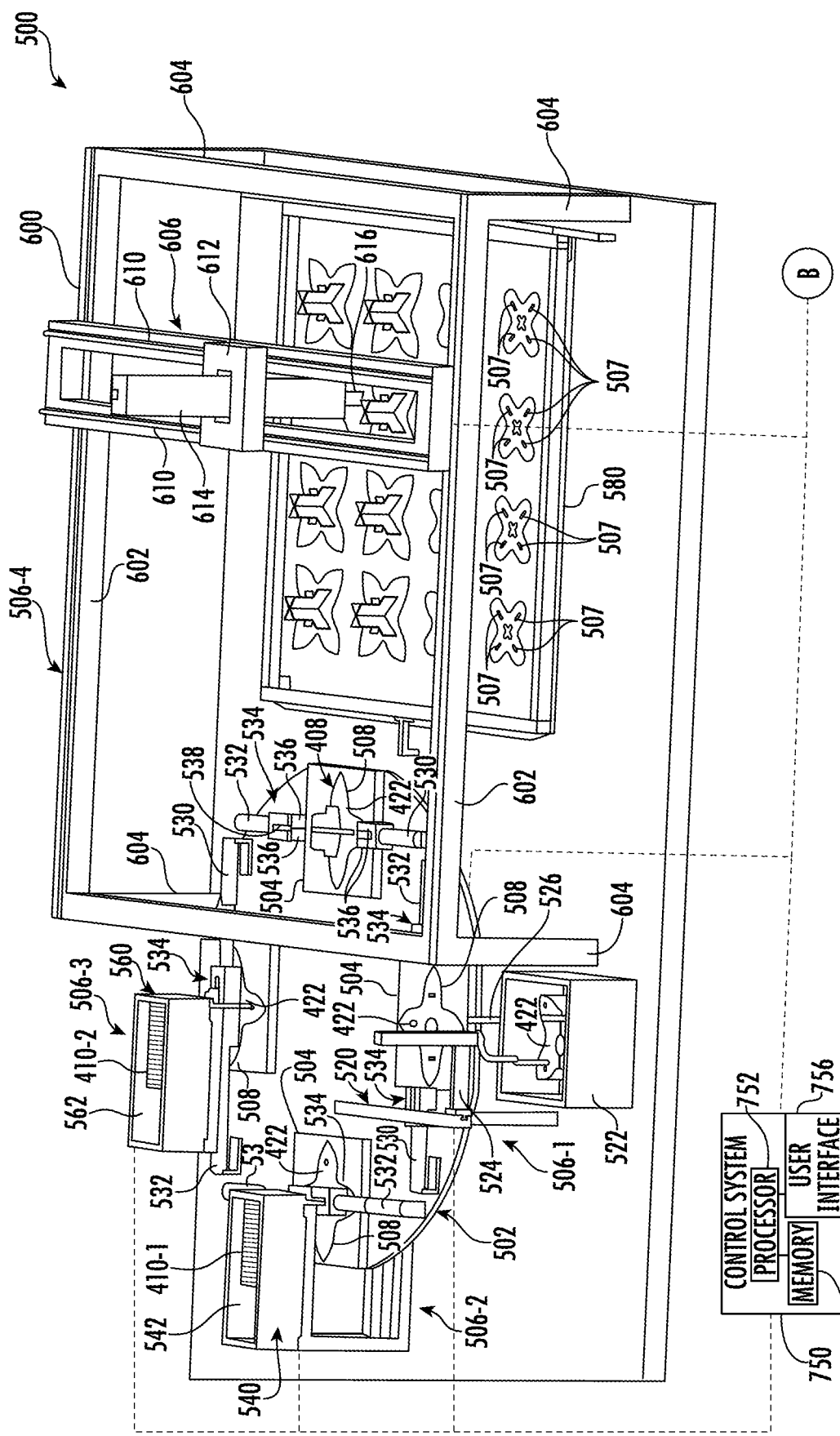
FIG. 8A is a perspective view of an embodiment of an assembly apparatus for a dipole assembly.
Figure 9:
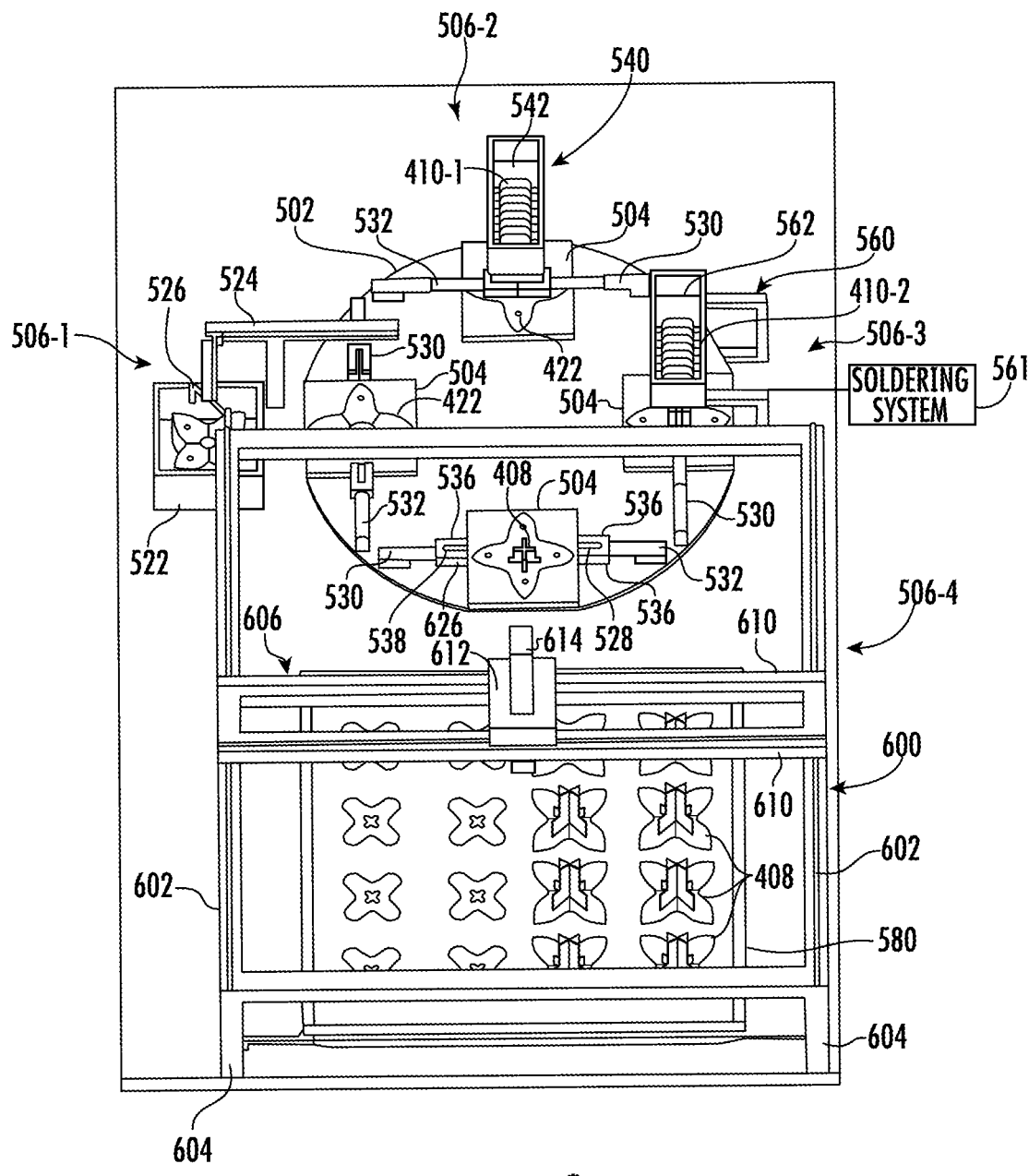
FIG. 9 is another perspective view of the assembly apparatus of FIG. 8.

Referring to FIGS. 8A and 9 an assembly apparatus 500 for assembling a dipole assembly 408 is illustrated. The assembly apparatus 500 comprises a movable conveyor that, in the illustrated embodiment, comprises a rotatable platform 502. Four fixtures 504 are supported by, and equally angularly spaced about, the platform 502. Four work stations 506-1 through 506-4 are equally spaced about the periphery of the platform 502 and are positioned such that one of the fixtures 504 is aligned with one of the work stations 506-1 through 506-4 at each work position of the platform 502. The platform 502 is rotated about a vertical axis by a suitable drive system such that the platform 502 is rotated sequentially to position each of the four fixtures 504 at each of the four work stations 506-1 through 506-4. In the illustrated embodiment, four assembly steps may be performed simultaneously with one assembly step being performed by each work station 506-1 through 506-4 at each work position of the platform 502. In the illustrated embodiment, the platform 502 is stopped in the work position and each assembly step is performed by the each of the work stations 506-1 through 506-4 with the fixtures 504 stationary. Stopping the platform 502 at each of the work stations makes the assembly process easier especially where tight tolerances are involved; however in some embodiments, in the work position, the platform 502 may not come to a complete stop such that the work stations 506-1 through 506-4 perform each assembly step as the fixtures 504 move past the work stations 506-1 through 506-4. In such an embodiment, the platform 502 may rotate at a first speed between the work positions and rotate at a second slower speed at the work positions.

In other embodiments, a greater number of assembly steps may be performed where the system comprises a corresponding number of fixtures 504 and work stations 506-1 through 506-n. In still other embodiments, each of the assembly steps may be duplicated such that the number of fixtures 504 and work stations 506-1 through 506-n may be doubled or tripled or the like such that the system has multiple work stations performing each of the assembly steps simultaneously. In other embodiments, the system may comprise duplicate work stations for certain assembly steps but a single work station for other assembly steps. In such an embodiment, the number of fixtures 504 may be different than the number of work stations.

The platform 502 is indexed to position the fixtures 504 at each of the work stations 506-1 through 506-4 in a step-wise manner. Typically, the fixtures 504 are adjacent to the work stations 506-1 through 506-4 at each work position. In the illustrated embodiment, having four fixtures 504 and four work stations 506-1 through 506-4, the platform 502 is rotated 90 degrees between each of the work positions such that each of the four fixtures 504 is positioned in a sequential manner adjacent each of the four work stations 506-1 through 506-4. In other embodiments, the platform 502 may be rotated different angular distances between the work positions. For example, where the number of work stations and fixtures is doubled the platform 502 may rotate 45 degrees between each work position. Non-uniform angular distances between the work stations may also be used.

Any suitable drive system may be used to rotate the platform 502. For example, a servo motor may be used to drive the platform 502 to allow for the precise control of angular position, velocity and acceleration of the platform. The servo motor may be coupled to a sensor for position feedback and may typically use a motor controller. In other embodiments, a suitable motor may rotate the platform 502 where the position of the platform is controlled by sensors that detect the position of the platform and control the operation of the motor. A suitable transmission system may be provided between the motor and platform for converting the motor output to a desired rotational motion of the platform 502.

Each fixture 504 is configured to securely hold a first assembly component. In one embodiment, the first assembly component comprises the radiating element 422 of the dipole assembly 408. The first assembly component may be considered a base component in that the first component is retained in the fixture 504 and the other downstream components are assembled vertically from the base component. It is to be understood that the terms vertical and horizontal are used to describe the operation of the assembly method and apparatus and that in actual use of the antenna these components may assume any spatial orientation. In one embodiment, the fixture 504 comprises a relatively planar member that includes a recess 508 for closely receiving the radiating element 422 of the dipole assembly. In some embodiments, a separate retaining member (not shown) such as a clamp, spring clip or the like may be used to securely hold the radiating element 422 in the fixture 504. Other holding structures may be used in place of the recess 508 for retaining the radiating elements 422 on the fixtures 504.

The first work station 506-1 is the base component loading station and comprises a loading device 520 configured to load one of the radiating elements 422 from a radiating element supply 522 onto the fixture 504. More specifically, the loading device 520 may include a loading arm 524 or other robotic device that is configured to unload a radiating element 422 from the supply 522 and to load the radiating element 422 on the fixture 504. The loading arm 524 or other robotic device may be an articulated, processor controlled arm capable of movement in two or three dimensions comprising a drive system for precisely controlling the position and movement of the arm. The loading arm 524 or other robotic device may comprise an end effector 526 for holding one of the radiating elements 422. The end effector 526 comprises the interface between the loading arm or other robotic device and the article being manipulated by the loading arm or other robotic device and may comprise a vacuum system, movable jaws, a stationary engagement structure or the like.

The supply 522 may comprise a cassette or a conveyor that holds a plurality of radiating elements 422. An advancing assembly including a drive system may be provided that is configured to consecutively present one of the radiating elements 422 in the supply 522 to the loading arm 524 or other robotic device. In the illustrated device, the advancing assembly advances the radiating elements 422 vertically. In place of the vertically advancing conveyor, the plurality of radiating elements 422 may be stored and advanced on a rotating wheel, horizontal conveyor or other device. Moreover, the radiating elements 422 may be stored vertically in supply 522 and be rotated 90 degrees as the radiating elements 422 are loaded into fixtures 504.

Mounted on platform 502 and associated with each fixture 504 are holding devices for aligning and holding the downstream components in place during the assembly process. In one embodiment, each of the holding devices comprises a pair of linearly reciprocating arms 530, 532 positioned such that the arms 530, 532 reciprocate toward and away from one another along a common axis. The arms 530, 532 move between a first, retracted position where the arms are positioned away from recess 508 such that the arms 530, 532 do not obstruct the loading or unloading of the radiating element 422 into or out of the fixture 504 (work stations 506-1, 506-4). The arms 530, 532 may move to a second, extended position in which the arms 530, 532 extend over the loaded fixture 504 and are positioned to align and hold the downstream components in position relative to the base component during the assembly process (work stations 506-2, 506-3). The arms 530, 532 are driven in a reciprocating manner by any suitable drive system such as a motor and transmission, fluid cylinder or the like. When the arms are in the extended position, the arms 530, 532 also hold the radiating element 422 in the fixtures 504.

Located at the distal end of each arm 530, 532 is a component holder 534 comprising a pair of spaced retainers or fingers 536. The retainers 536 are spaced from one another to create a vertically extending channel 538 that extends parallel to the arms 530, 532 for receiving a component vertically. The width of the channels 538 is selected to allow a first downstream component to be vertically inserted into channel 538 between the retainers 536 of both of arms 530 and 532. The retainers 536 closely receive the first downstream component to align and maintain the first downstream component in position relative to the base component. In the extended position of the arms 530, 532 (shown at work stations 506-2 and 506-3), the channel 538 on the first arm 530 and the channel 538 on the second arm 532 cooperate to hold a single component. The channels 538 are vertically aligned with a first pair of slots 267 in the radiating element 422 such that a printed circuit board 410-1 may be inserted into the channels 538 and be guided into the first pair of slots 267 in the radiating element 422.

In the extended position of the arms 530, 532 the distal ends of the retainers 536 on the first arm 530 are spaced from the distal ends of the retainers 536 on the second arm 532 by a distance to create a second channel that receives a second downstream component that is inserted vertically between and transversely to the arms 530, 532. The space between the ends of the retainers 536 of arms 530, 532 in the extended position is selected such that the second downstream component may be inserted vertically in the second channel between the retainers 536 but the second downstream component is closely received to align and maintain the second downstream component in position relative to the first downstream component and to the base component. The second channel is vertically aligned with the second pair of slots 267 in the radiating element 422 such that a printed circuit board 410-1 may be inserted into the second channel and be guided into the second pair of slots 267 in the radiating element 422.

Another embodiment of a component holding device is shown in FIG. 8B. The component holding device comprises a pair of rotating arms 1530, 1532 positioned such that the arms 1530, 1532 rotate on spaced parallel axes 1555 relative to the fixtures 504. The arms 1530, 1532 rotate between a first, retracted position where the arms are positioned away from recess 508 such that the arms 1530, 1532 do not obstruct the loading or unloading of the radiating element 422 into or out of the fixture 504 (work stations 506-1, 506-4). The arms 1530, 1532 may rotate to a second, extended position in which the arms 1530, 1532 extend over the loaded fixture 504 and are positioned to align and hold the downstream components in position relative to the base component during the assembly process (work stations 506-2, 506-3). The arms 1530, 1532 may be driven in a rotating manner by any suitable drive system such as a motor and transmission, fluid cylinder or the like. When the arms are in the extended position, the arms 1530, 1532 also hold the radiating element 422 in the fixtures 504.

Each of arms 1530, 1532 comprises a flat plate 1533 that is oriented substantially parallel to the radiating element 422 in the extended position. A component holder 1534 comprises a pair of spaced retainers 1536 that extend along a slot 1535 in the plate 1533. The retainers 1536 are spaced from one another to create a vertically extending channel 1538 that extends perpendicularly relative to plate 1533 and that receives a component vertically when the arms 1530, 1532 are in the extended position. The width of the channels 1538 is selected to allow a first downstream component to be vertically inserted into channel 1538 between the retainers 1536 of both of arms 1530 and 1532. The retainers 1536 closely receive the first downstream component to align and maintain the first downstream component in position relative to the base component. In the extended position of the arms 1530, 1532 (shown at work stations 506-2 and 506-3), the channel 1538 on the first arm 1530 and the channel 1538 on the second arm 1532 cooperate to hold a single component. The channels 1538 are vertically aligned with a first pair of slots 267 in the radiating element 422 such that a printed circuit board 410-1 may be inserted into the channels 1538 and be guided into a first pair of slots 267 on the radiating element 422.

In the extended position of the arms 1530, 1532 the distal ends 1536a of the retainers 1536 on the first arm 1530 are spaced from the distal ends 1536a of the retainers 1536 on the second arm 1532 by a distance to create a second channel that receives a second downstream component that is inserted vertically between and transversely to the arms 1530, 1532. The space between the ends 1536a of the retainers 1536 of arms 1530, 1532 in the extended position is selected such that the second downstream component may be inserted vertically in the second channel between the retainers 1536 but the second downstream component is closely received to align and maintain the second downstream component in position relative to the first downstream component and to the base component.

The second work station 506-2 assembles the first downstream component to the base component in the fixture 504. In the case of the dipole assembly 408, the first downstream component comprises printed circuit board 410-1 and the base component in the fixture 504 comprises the radiating element 422 as previously described. The platform 502 is rotated to positon the fixture 504 adjacent the second work station 506-2. The second work station 506-2 assembles the printed circuit board 410-1 to the radiating element 422.

Specifically, the second work station 506-2 comprises a first automated vertical assembly machine 540 configured to assemble a printed circuit boards 410-1 from supply 542 to the radiating element 422 in the fixture 504. The supply 542 may hold a plurality of printed circuit boards 410-1. An advancing mechanism including a drive system may be configured to consecutively present the printed circuit boards 410-1 in the supply 542 to a position vertically above the radiating element 422 in the fixture 504. In the illustrated device, the printed circuit boards 410-1 are stored vertically and the advancing assembly advances the printed circuit boards 410-1 horizontally. A loading assembly (not shown) comprising a loading arm, plunger or other robotic device is configured to move a printed circuit board 410-1 from the supply 542 and to assemble the printed circuit board 410-1 on radiating element 422 in the fixture 504. In one embodiment, the loading assembly moves the printed circuit board 410-1 vertically downward such that the printed circuit board 410-1 is inserted into the channels 538 formed between the retainers 536 of the first arm 530 and second arm 532. The upper plated projections 418 of the printed circuit board 410-1 are inserted into the slots 267 formed in the radiating element 422 to connect the components together. In the illustrated embodiment, the radiating element 422 actually sits on top of the printed circuit boards as shown in FIG. 7. The dipole assemblies 408 are assembled in an inverted orientation as compared to FIGS. 6 and 7 such that the upper plated projections 418 face downward, toward the radiating element 422, during the assembly process. To accommodate the upper plated projections 418, the fixture 504 may be provided with apertures or depressions 507 that are located under the slots 267 such that the upper plated projections 418 may be inserted into the slots 267 and extend beyond the surface of the radiating member 422 without interference from the fixture. While the apertures or depressions 507 are not visible in holders 504 because the radiating elements 422 are loaded in the holders, similar apertures or depressions 507 are visible in the storage device 508. The retainers 536 of component holders 534 maintain the printed circuit board 410-1 in the aligned, vertical position during the assembly process.

While a supply 542 is described that uses an advancing mechanism to position the printed circuit board 410-1 over the radiating element 422 and a plunger to vertically insert the printed circuit board 410-1 into the radiating element 422, the first automated vertical assembly machine 540 may comprise an articulated, robotic arm or other device that both positions the printed circuit board 410-1 relative to the radiating element 422 and that inserts the printed circuit board 410-1 vertically into the radiating element 422. The arm may comprise an end effector for gripping one of the printed circuit boards 410-1 such as a vacuum system, movable jaws, a stationary engagement structure or the like.

The third work station 506-3 assembles the second vertical component to the base component in the fixture 504. In the case of the dipole assembly 408, the second vertical component comprises printed circuit board 410-2 and the horizontal component in the fixture 504 comprises the radiating element 422 as previously described. The platform 502 is rotated to positon the fixture 504 adjacent the third work station 506-3. The third work station 506-3 mounts the printed circuit board 410-2 to the radiating element 422 and to the first printed circuit board 410-1. The third work station 506-3 comprises a second automated vertical assembly machine 560 configured to assemble one of the printed circuit boards 410-2 from supply 562 to the radiating element 422 in the fixture 504. The second automated vertical assembly machine 560 may be substantially the same as the first automated vertical assembly machine 540 as previously described and the supply 562 may hold a plurality of printed circuit boards 410-2. An advancing mechanism including a drive system may be configured to consecutively present the printed circuit boards 410-2 in the supply 562 to a position vertically above the radiating element 422 in the fixture 502. The second automated vertical assembly machine 560 may comprise a loading arm, plunger or other robotic device that is configured to move a printed circuit board 410-2 vertically downward from the supply 562 and to assemble the printed circuit board 410-2 to a radiating element 422.

The printed circuit board 410-2 is mounted on the radiating element 422 generally perpendicularly thereto and perpendicular to the first printed circuit board 410-1 such that the printed circuit boards 410-1 and 410-2 nest to create the substantially x-shaped feed stalk 410 as previously described. Because the platform 502 rotates 90° between the work stations 506-2 and 506-3 and the work stations 506-2 and 506-3 are spaced 90 degrees from one another, the rotation of the platform 502 reorients the fixture 504 and dipole assembly 90° between the second work station 506-2 and the third work station 506-3 such that the second automated vertical assembly machine 560 may be arranged in the same orientation as the first automated vertical assembly machine 540.

In one embodiment, the second automated vertical assembly machine 560 moves the printed circuit board 410-2 vertically downward such that the printed circuit board 410-2 is inserted into the second channel formed between the ends of the retainers 536 of the first arm 530 and the second arm 532. The slots 417 and 419 on the boards 410-1 and 410-2, respectively, engage one another to allow the boards to nest and create the x-shaped configuration as shown in FIG. 7. The upper plated projections 418 of the printed circuit board 410-2 are inserted into the slots 267 formed in the radiating element 422 to connect the components together. The retainers 536 of holders 534 maintain the printed circuit board 410-2 in the aligned, vertical position during the assembly process.

While a second automated vertical assembly machine 560 is described that uses a horizontal advancing mechanism to position the printed circuit board 410-2 over the radiating element 422 and a plunger to vertically insert the printed circuit board 410-2 into the radiating element, the second automated vertical assembly machine 560 may comprise an articulated, robotic arm or other device that both positions the printed circuit board 410-2 relative to the radiating element 422 and that inserts the printed circuit board 410-2 vertically into the radiating element 422. The arm may comprise an end effector for gripping one of the printed circuit boards 410-2 such as a vacuum system, movable jaws, a stationary engagement structure or the like.

In some embodiments, the printed circuit boards 410-1 and 410-2 are soldered to the radiating member 422. In one embodiment, the soldering system may be provided downstream of the assembly apparatus 500 where for example the printed circuit boards 410-1 and 410-2 are soldered to the radiating member 422 after these components are loaded into the storage device 580 and moved to a soldering station. In other embodiments, a soldering system 561 (FIG. 9) may be provided with or after the third work station 506-3 to solder both of the printed circuit boards 410-1 and 410-2 to the radiating element 422. In other embodiments, a soldering system 561 may be provided at each of the second work station 506-2 and the third work station 506-3. The soldering system 561 may comprise an automated continuous or selective wave soldering system. Such an automated wave soldering systems may decrease manufacturing costs and provide for more consistent and/or improved solder joints.

Once the printed circuit boards 410-1 and 410-2 are assembled to the radiating element, the inter-engagement of these components, with or without soldering, provides sufficient structural support that the arms 530, 532 may be retracted and the dipole assembly 408 will remain in the assembled state.

At the fourth work station 506-4, the dipole assembly 408 may be unloaded from the fixture 504 and sent for further processing, such as soldering. The arms 530, 532 are retracted at the fourth work station to allow access to the dipole assembly 408. As shown in FIGS. 8 and 9, an unloading device 600 comprising a gantry system is provided for unloading the dipole assembly 408 from the platform 502 and for moving the assembled dipole assembly 408 to a storage device 580 such as a pallet, rack or the like. The gantry system may comprise an end effector 616 that can releasably engage and hold a dipole assembly 408. The end effector 616 may comprise a vacuum system, movable jaws, a stationary engagement structure or the like. The end effector 616 is mounted for movement along orthogonal x, y and z directions such that the end effector 616 may be moved in the x-direction and y-direction to be positioned over the completed dipole assembly 408 at the fourth work station 506-4. The end effector 616 may then be extended in the z-direction to engage the dipole assembly 408. The end effector 616 may be retracted in the z-direction and moved in the x-direction and y-direction to be positioned over a location on storage device 580. The end effector 616 may then be extended in the z-direction to release the dipole assembly 408 onto the storage device 580. The loaded storage device 580 may then be moved for further processing, such as soldering, and/or assembly of dipole and/or antenna.

In one embodiment, the gantry system comprises a pair of rails 602 extending in the x-direction and supported on uprights 604 so as to be positioned vertically above the platform502. A carriage 606 rides on the rails 602 and is movable in the x-direction. The carriage 606 may be moved by any suitable drive system including, but not limited to, an electric motor and transmission, fluid drive such as a hydraulic or pneumatic system or the like. The carriage 606 comprises a pair of rails 610 extending in the y-direction. A second carriage 612 rides on the rails 610 and is movable in the y-direction. The second carriage 612 may be moved by any suitable drive system including, but not limited to, an electric motor and transmission, fluid drive such as a hydraulic or pneumatic system or the like. The second carriage 612 supports a vertically reciprocating arm 614 that moves in the z-direction and that supports the end effector 616 at its lower end. The vertically reciprocating arm 614 may be moved by any suitable drive system including, but not limited to, an electric motor and transmission, fluid drive such as a hydraulic or pneumatic system or the like.

In this and other embodiments described herein, the operation of the system components including the drive systems of the platform 502 and the work stations 506-1-506-4, and the conveyors for moving storage device 580 such as loading systems 850 and elevator 900, may be controlled by a suitable control system 750 comprising a processor, memory and user interface. The control system 750 controls operation of the various components of the assembly system. In some embodiments, the control system 750 may comprise a processor 752 communicably coupled to such devices as a memory 754 and a user interface 756. The processor 752 generally includes circuitry for implementing communication and/or logic functions of the system. The processor 752 may include functionality to operate one or more software programs, which may be stored in the memory 754. The control system 750 may be a central controller located remotely from the work stations, or various functions of the control system 750 may be allocated between the work stations and a central controller.

As used herein, a "processor" refers to a device or combination of devices having circuitry used for implementing the communication and/or logic functions of the system. For example, the processor 752 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in memory 754. As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory" generally refers to a device or combination of devices that store one or more forms of computer-readable media for storing data and/or computer-executable program code/instructions. For example, in one embodiment, the memory 754 as described herein includes any computer memory that provides an actual or virtual space to temporarily or permanently store data and/or commands provided to the processor 752 when the processor carries out its functions described herein. As used herein, "memory" includes any computer readable medium configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like.

The user interface 756 may be made up of user output devices and/or user input devices, which are operatively coupled to the processor 752. The user output devices may include a visual display, audio device and/or the like. The user input devices may include any of a number of devices allowing the control system 750 to receive data, such as a keypad, keyboard, touch-screen, touchpad, microphone, mouse, joystick, other pointer device, button, soft key, and/or other input device(s).

In the illustrated embodiment, the assembly apparatus 500 and associated assembly methods assemble the printed circuit boards 410-1 and 410-2 to the radiating element 422 to create the dipole assembly 408. In other embodiments, additional assembly steps may be made part of the assembly process. The dipole assembly 408 may be assembled as described with respect to FIGS. 8 and 9 and the director support and director may be assembled to the dipole assembly after the dipole assembly is removed from the storage device 580 and inverted. In such methods of assembly, additional work stations may be provided that assemble the director support 430 and director 440 to the dipole assembly 408 using similar automated vertical assembly machines and methods as previously described. Moreover, in some embodiments, the radiating element 422 may comprise a plastic substrate having metal traces attached thereto in place of the printed circuit board as described previously. In such embodiments, the assembly apparatus and method may include an initial assembly step in which the metal traces are connected to the plastic substrate before the printed circuit boards 410-1 and 410-2 are assembled to the radiating element 422. In still other embodiments, the printed circuit board 272 of the dipole-to-feed board assembly 270 may be secured to one or more of the dipole assemblies 408 after the dipole assemblies are moved to the storage device 580.

Figure 14:
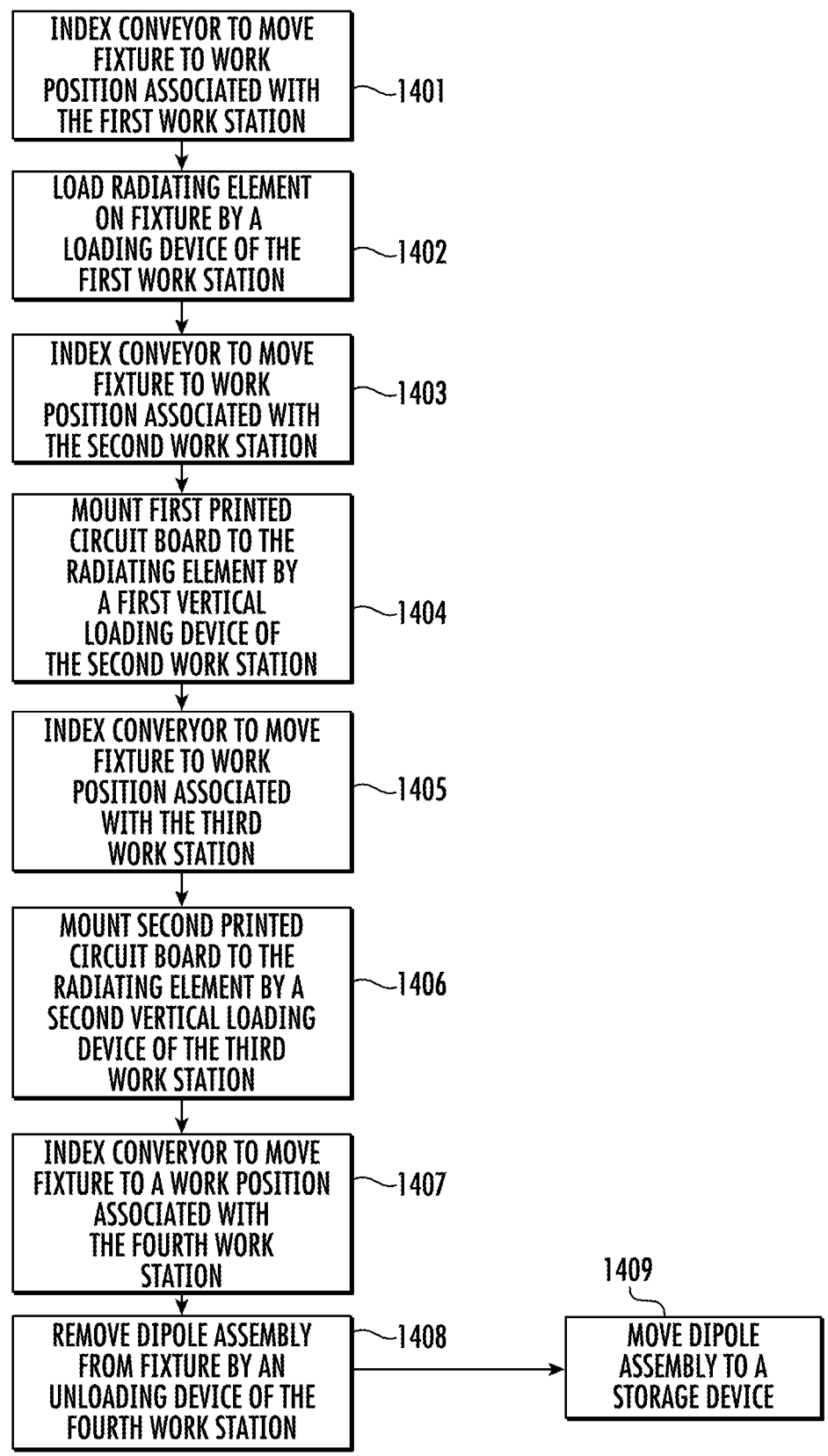
FIG. 14 is a flow chart illustrating an embodiment of a method of assembling a dipole assembly.
Figure 15:
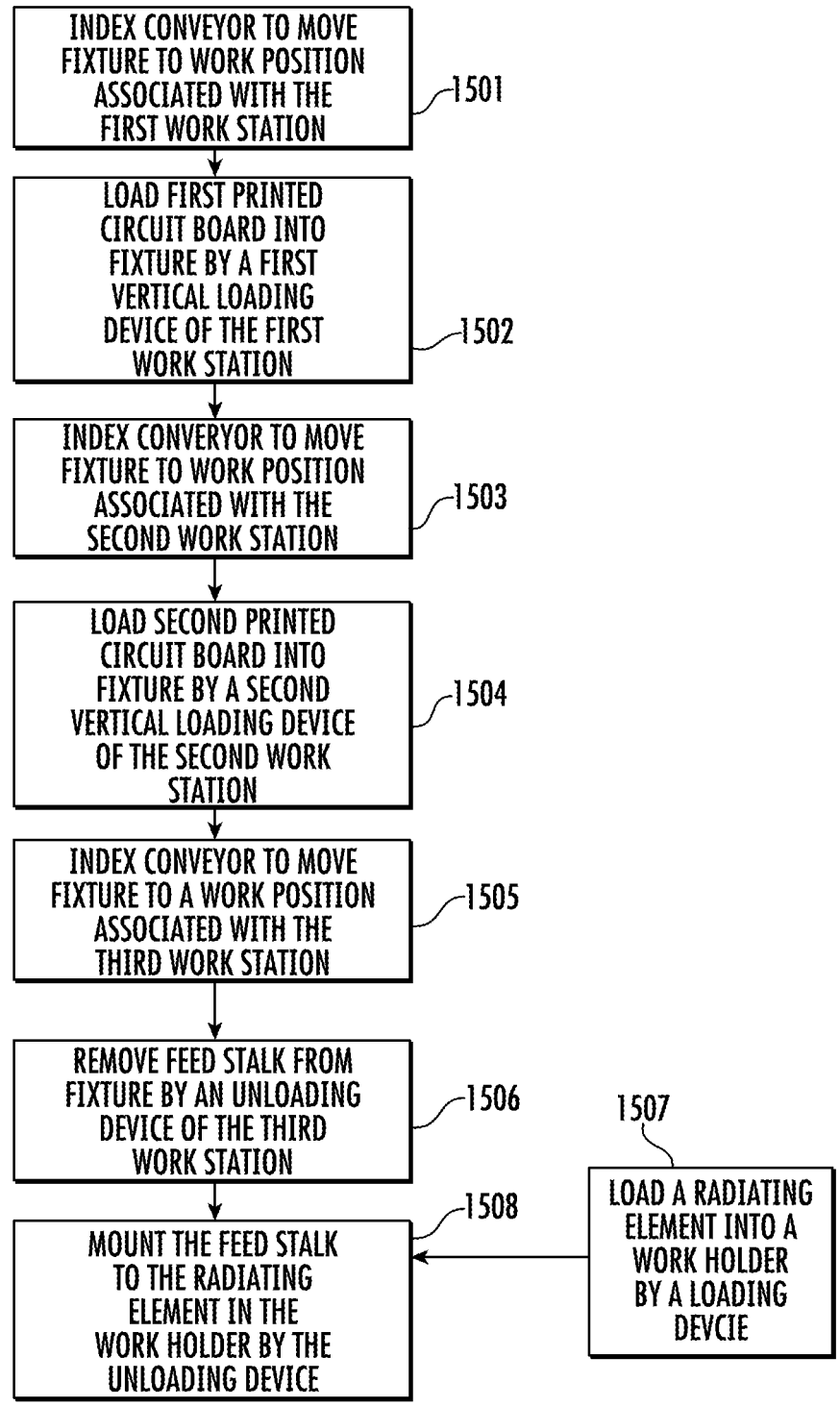
FIG. 15 is a flow chart illustrating another embodiment of a method of assembling a dipole assembly.

In one method of assembling a dipole assembly, the movable conveyor 502 supporting at least one fixture 504 is indexed such that the fixture 504 is moved to a work position adjacent the first work station 506-1 (Block 1401), FIG. 14. A radiating element 422 is loaded onto the fixture 504 by a loading device 520 at the first work station 506-1 (Block 1402). The movable conveyor 502 is indexed such that the fixture 504 is moved to a work position adjacent the second work station 506-2 (Block 1403). A first printed circuit board 410-1 is mounted to the radiating element 422 by a first automated vertical assembly machine 540 at the second work station 506-2 (Block 1404). The movable conveyor 502 is indexed such that the fixture 504 is moved to a work position adjacent the third work station 506-3 (Block 1405). A second printed circuit board 410-2 is mounted to the radiating element 422 by a second automated vertical assembly machine 560 at the third work station 506-3 (Block 1406). The movable conveyor 502 is indexed such that the fixture 504 is moved to a work position adjacent the fourth work station 506-4 (Block 1407). The dipole assembly is removed from the fixture by an unloading system 600 at the fourth work station 506-4 (Block 1408). The dipole assembly is moved to a storage device 580 such as pallet, rack or the like (Block 1409).

Another embodiment of an assembly apparatus and method will be described with reference to FIG. 10. In this embodiment, the system uses the rotating platform as the conveyor 502, first automated vertical assembly machine 540, second automated vertical assembly machine, unloading device 600 and control system 750 (not shown) as previously described. However, the platform 502 includes fixtures 700 that are configured to hold the printed circuit boards 410-1 and 410-2 rather than the radiating element 422. The fixtures 700 comprise a vertically extending block that has a pair of slots 702, 704 formed therein that are arranged perpendicularly relative to one another. The slots 702, 704 are configured to closely receive the printed circuit boards 410-1 and 410-2, respectively, and to hold the printed circuit boards 410-1 and 410-2 in a vertical orientation. The system includes a first work station 1506-1 for inserting a first printed circuit board 410-1 into a first slot 702 of the fixture 700 and a second work station 1506-2 for inserting a second printed circuit board 410-2 into the second slot 704 of the fixture 700 such that the circuit boards 410-1 and 410-2 engage one another and are configured as shown in FIG. 7. The work stations 1506-1 and 1506-2 include first and second automated vertical assembly machines 540 and 560, respectively, that are similar to the first and second first automated vertical assembly machines 540, 560 described with respect to FIGS. 8 and 9. The work station 1506-1 comprises a first automated vertical assembly machine 540 configured to insert one of the printed circuit boards 410-1 from a supply 542 into slot 704 of the fixture 700. The supply 542 may hold a plurality of printed circuit boards 410-2 as previously described. An advancing assembly including a drive system may be configured to consecutively present the printed circuit boards 410-2 in the supply 542 to a position vertically above the fixture 700. A loading assembly comprising a loading arm, plunger or other robotic device is configured to move a printed circuit board 410-2 from the supply and to insert the printed circuit board 410-2 vertically into the first slot 704 of the fixture 700. Because the platform 502 rotates and the work stations 1506-1 and 1506-2 are spaced 90°, the rotation of the platform 502 reorients the fixtures 700 90° between the first work station 1506-1 and the second work station 1506-2 such that the first automated vertical assembly machine 540 may be arranged in the same orientation as the second automated vertical assembly machine 560. The second work station 1506-2 operates in the same manner as the first work station 1506-1 to insert the second printed circuit board 410-2 into the slot 702 of fixture 700 perpendicular to the first printed circuit board 410-1. The slot 419 on the printed circuit board 410-2 engages the slot 417 on the printed circuit board 410-1 to allow the boards to be assembled to create the feed stalk 410 as described with respect to FIG. 7.

The unloading system 600 is located at the third work station 1506-3. The unloading system may comprise a gantry system that operates in the same manner as the gantry system of the embodiment of FIGS. 9 and 10. However, the storage device 1580, such as a pallet or rack, is pre-loaded, either manually or by a separate automated system, with the base component, i.e. the radiating element 422, such that the gantry system, rather than unloading complete dipole assemblies, as was the case with the embodiment shown in FIGS. 8 and 9, forms part of the dipole assembly process. The gantry system moves in the x- and y-directions to position the end effector 616 over the printed circuit board subassembly or feed stalk 410 at the third work station 1506-3. The end effector 616 is lowered to grip and remove the printed circuit board sub-assembly or feed stalk 410 from the platform 502. The gantry system 600 moves the printed circuit board subassembly or feed stalk 410 over a radiating element 422 on the storage device 1580. The gantry system 600 lowers the printed circuit board subassembly or feed stalk 410 onto the radiating element 422 to attach the printed circuit board subassembly or feed stalk 410 to the radiating element 422 and create the dipole assembly 408. The upper plated projections 418 on the printed circuit boards are inserted into the mating slots 267 on the radiating element 422 to form the dipole assembly 408. The storage device 1580 may then be moved for further processing, such as soldering, and/or assembly of dipole and/or antenna. As previously explained, the gantry system may be replaced by an articulated arm.

Another embodiment of an assembly apparatus and method will be described with reference to FIG. 11. The embodiment of FIG. 11 is substantially the same as the embodiment of FIG. 10 except that the conveyor 502 comprises a plurality of fixture assemblies 1700, each including a fixture 700 as previously described, rather than the rotating platform 502. The fixture assemblies 1700 are driven in a circular path by a chain or belt drive system 800. The fixture assemblies 1700 and chain or belt drive system 800 may also be used in the embodiment of FIGS. 8 and 9 to move the fixtures 504.

Another embodiment of an assembly apparatus and method will be described with reference to FIG. 12. The embodiment of FIG. 12 is similar to the embodiment of FIG. 10 with a separate loading system 850 for the radiating elements 422. In the embodiment of FIG. 12, a second gantry system 1600 is illustrated that is used to load the radiating elements 422 onto the storage device 1580. The gantry system 1600 picks radiating elements 422 from a supply 852 such as a conveyor, storage device or the like. The radiating elements 422 are loaded onto the storage device 1580 at predetermined locations. The positions may comprise holders such as recesses 854 similar to the recesses 508 on fixtures 504. The loaded storage device 1580 is then moved to the third work station 1506-3 where the printed circuit board subassemblies or feed stalks 410 are attached to the radiating elements 422 as previously explained with respect to FIGS. 10 and 11. In the system of FIG. 12 the first gantry system 600 and the second gantry system 1600 are disposed at the same elevation such that the pallets are moved generally horizontally from the second gantry system 1600 to the third work station 1506-3. Any suitable conveyor system may be used to move the pallets 508 from the second gantry system to the third work station 1506-3 including a conveyor system, automated truck, robotic arm or the like.

Another embodiment of an assembly apparatus and method will be described with reference to FIG. 13. The embodiment of FIG. 13 is similar in some respects to the embodiment of FIG. 12 except that a vertically movable elevator system 900 is used for loading the radiating elements 422 onto the storage devices 1580 and for moving the storage devices through the assembly system as is shown. In the system illustrated in FIG. 13, the two gantry systems 600 and 1600 are vertically disposed relative to one another rather than being horizontally disposed relative to one another as in the embodiment of FIG. 12. The first gantry system 1600 is used to load the radiating elements 422 onto an empty storage device 1580. The storage device 1580, loaded with radiating elements 422, is moved vertically by a lift system 902 such as a motor or fluid driven elevator, or the like. The second gantry system 600 secures the printed circuit board subassembly or feed stalk 410 to the radiating elements 422 on the storage holder 1580 as previously described. The work holder 1580 with the completed dipole assemblies may then be moved for further processing, such as soldering, or assembly.

In one method of assembling a dipole assembly, the movable conveyor 502 supporting a fixture 700 is indexed such that the fixture 700 is moved to a work position adjacent the first work station 1506-1 (Block 1501). A first printed circuit board 410-1 is loaded into the fixture 700 by a first automated vertical assembly machine 540 at the first work station 1506-1 (Block 1502). The movable conveyor 502 is indexed such that the fixture 700 is moved to a work position adjacent the second work station 1506-2 (Block 1503). A second printed circuit board 410-2 is loaded into the fixture 700 by a second automated vertical assembly machine 560 at the second work station 1506-2 to create a feed stalk 410 (Block 1504). The movable conveyor 502 is indexed such that the fixture 700 is moved to a work position adjacent the third work station 1506-3 (Block 1505). The feed stalk 410 is removed from the fixture 700 by an unloading assembly 600 at the third work station 1506-3 (Block 1506). A radiating element 422 is loaded onto a storage device 1580 by a loading assembly (Block 1507). The feed stalk 410 is mounted to the radiating element 422 in the storage device 1580 by the unloading assembly 600 at the third work station 1506-3 (Block 1508).

The methods and apparatuses described above may be used to assemble dipole assemblies having different configurations than the dipole assembly 408 as described above. For example, the assembly apparatuses and methods disclosed herein may be used with the low band radiating elements 300 as previously described with respect to FIGS. 1-3. Referring to FIGS. 3 and 16-19, low band radiating elements 300-1, 300-2 are shown that extend upwardly from a printed circuit board 1352. The printed circuit board 1352 includes RF transmission line feeds 1354 that provide RF signals to, and receive RF signals from, the respective low band radiating elements 1300-1, 1300-2. Each low band radiating element 1300 may include a feed stalk 1310, a dipole support 1320, four dipole arms 1330-1 to 1330-4, and a director 1340.

Figure 19:
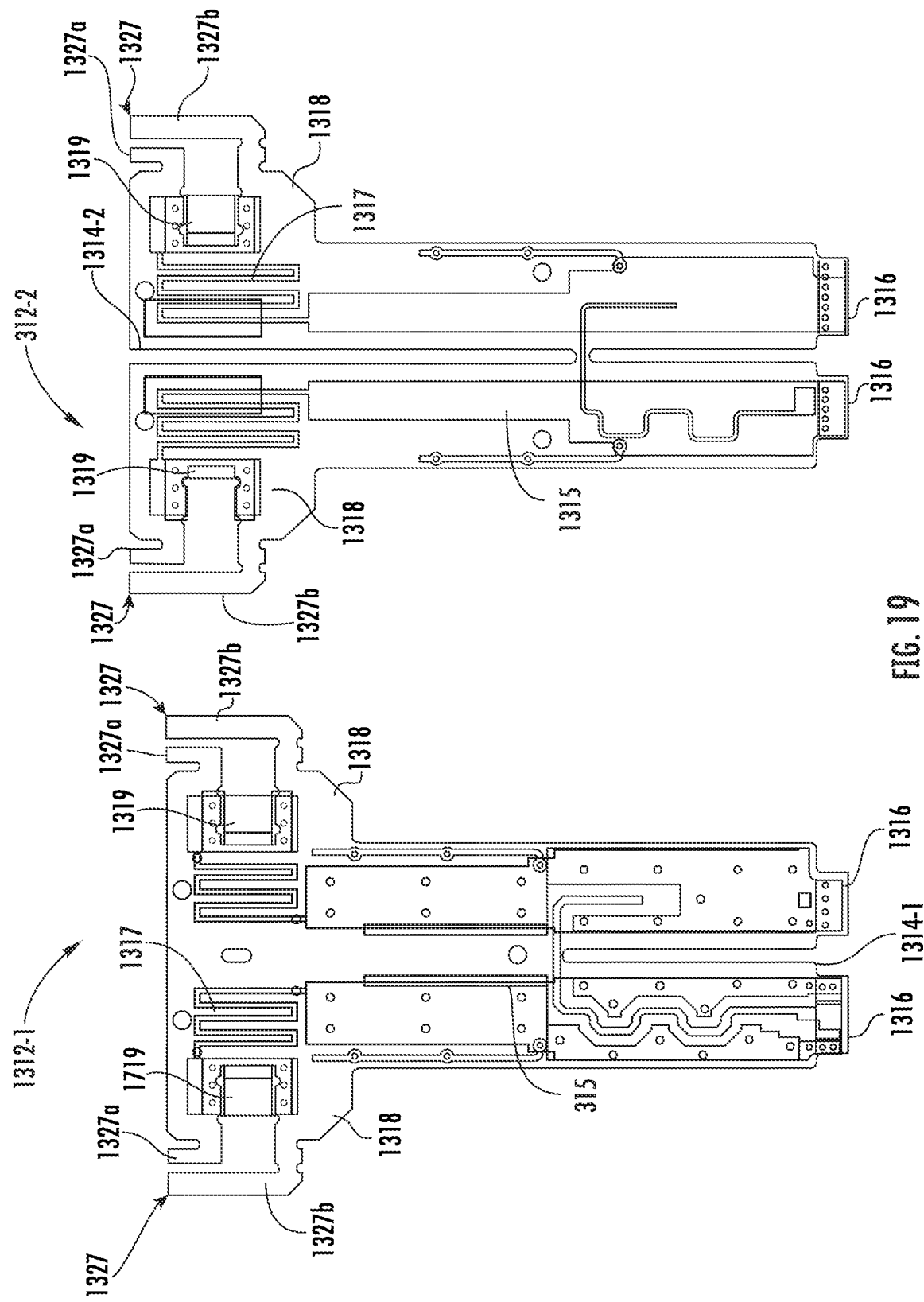
FIG. 19 is a side view of the printed circuit boards used to form the feed stalks for the low band radiating elements included in the dipole-to-feed board assembly of FIGS. 16-18.

The feed stalk 1310 may comprise a first printed circuit board 1312-1 that includes a lower slit 1314-1 and a second printed circuit board 1312-2 that includes an upper slit 1314-2 (FIG. 19). The slits 1314-1, 1314-2 allow the printed circuit boards 1312-1, 1312-2 to be assembled together to form a vertically extending column that has generally x-shaped horizontal cross-sections. Lower portions of each printed circuit board 1312 include plated projections 1316. These plated projections 1316 of the printed circuit boards 1312 are inserted through slits 1356 in the printed circuit board 1352. The plated projections 1316 of printed circuit board 1312 may be soldered to plated portions on printed circuit board 1352 that are adjacent the slits 1356 to electrically connect the printed circuit boards 1312 to the printed circuit board 1352. The plated projections 1316 may also facilitate using automated continuous or selective wave soldering techniques to solder the printed circuit boards 1312 to the printed circuit board 1352. Such automated continuous or selective wave soldering techniques may decrease manufacturing costs and provide for more consistent and/or improved solder joints.

Each printed circuit board 1312 includes a pair of arms 1318 that has a plated portion 1319 at the base thereof. The configuration of the arms 1318 may be based on the design of the radiating elements 1330 so that the radiating elements 1330 may be mounted on the respective arms 1318. Each arm 1318 terminates in an upwardly extending dipole clip 1327 made of a pair of upwardly extending projections. Each printed circuit board 1312 may consist of a single substrate with conductive traces on both sides, or may consist of a bonded set of substrates to form a bonded printed circuit board with conductive traces on both sides and in between the bonded substrates. Each printed circuit board includes transmission lines 1315 that carry RF signals between the printed circuit board 1352 and the radiating elements 1330.

The dipole support 1320 may comprise, for example, a plastic support that is mounted to and extends upwardly from the printed circuit board 1352. In the depicted embodiment, each dipole support 1320 comprises a base 1322 that surrounds the lower portions of a mated pair of printed circuit boards 1312. Arms 1324 extend upwardly and outwardly from the base 1322. The arms 1324 terminate in upwardly extending dipole clips 1326 that is configured to receive and hold a central portion of a respective one of the radiating elements 1330. In the depicted embodiment, each dipole clip 1326 comprises a pair of cantilevered fingers that together define a semi-circular inner radius. Horizontal supports 1329 extend between adjacent arms 1324 to provide additional structural rigidity. The dipole supports 1320 help hold the radiating elements 1330 in their proper positions and reduce the forces applied to the joint where the radiating elements 1330 connect to their respective arms 1318 on the printed circuit boards 1312. The dipole supports 1320 may also reduce the forces applied to the solder joints where feed stalks 1310 connect to the feed board printed circuit board 1352. In the illustrated embodiment, the radiating elements 1330 are shown as barrel-style radiating elements; however, radiating elements 1330 may also comprise flat radiating elements.

Figure 16:
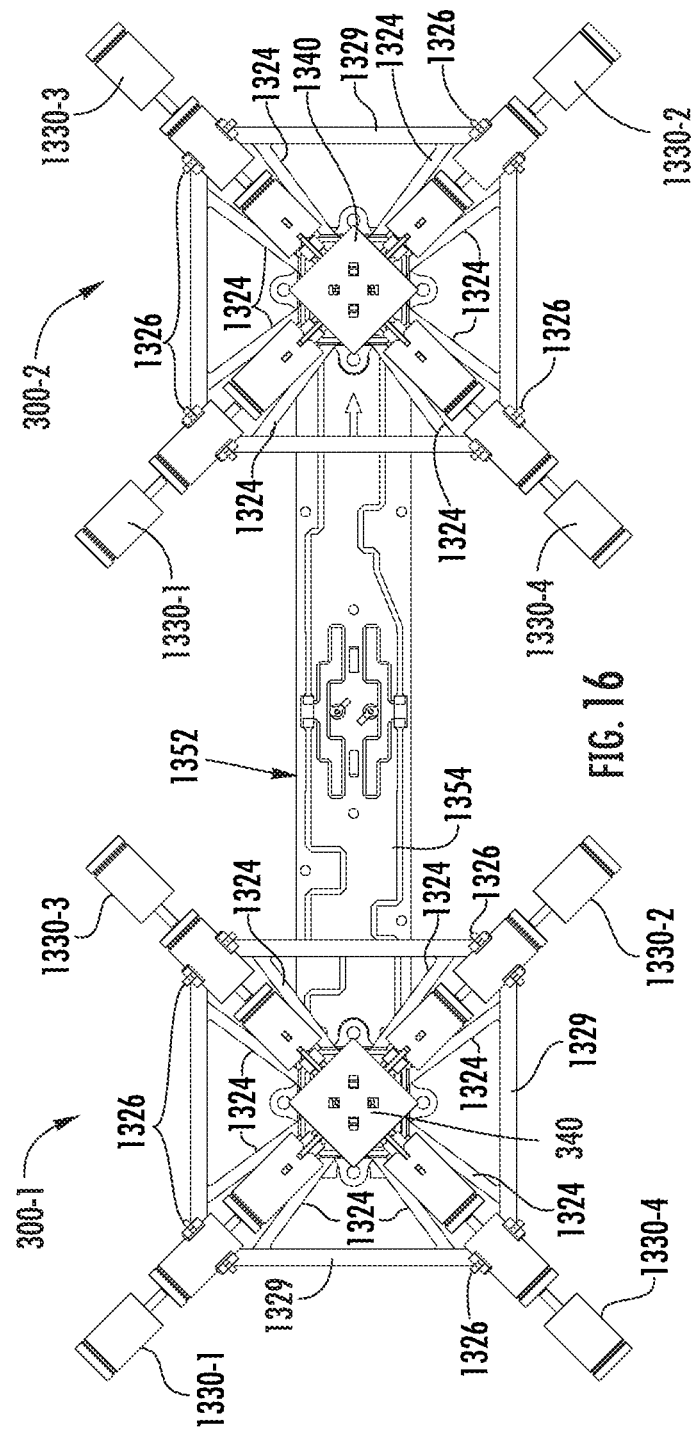
FIGS. 16, 17 and 18 are a top view, a bottom view and a perspective view of a dipole-to-feed board assembly of the antenna of FIG. 1 that includes two low band radiating elements.
Figure 17:
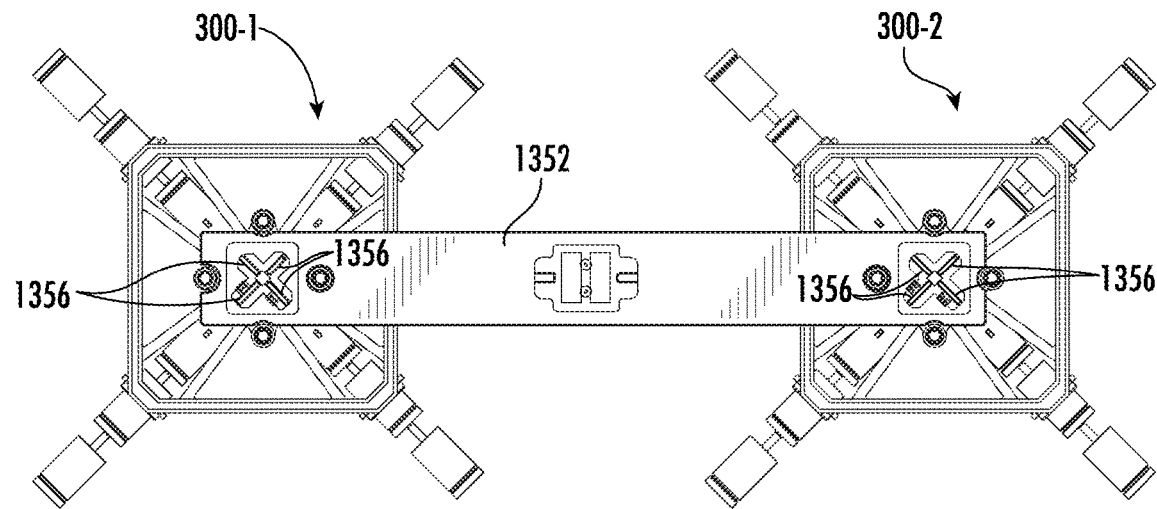
Figure 18:
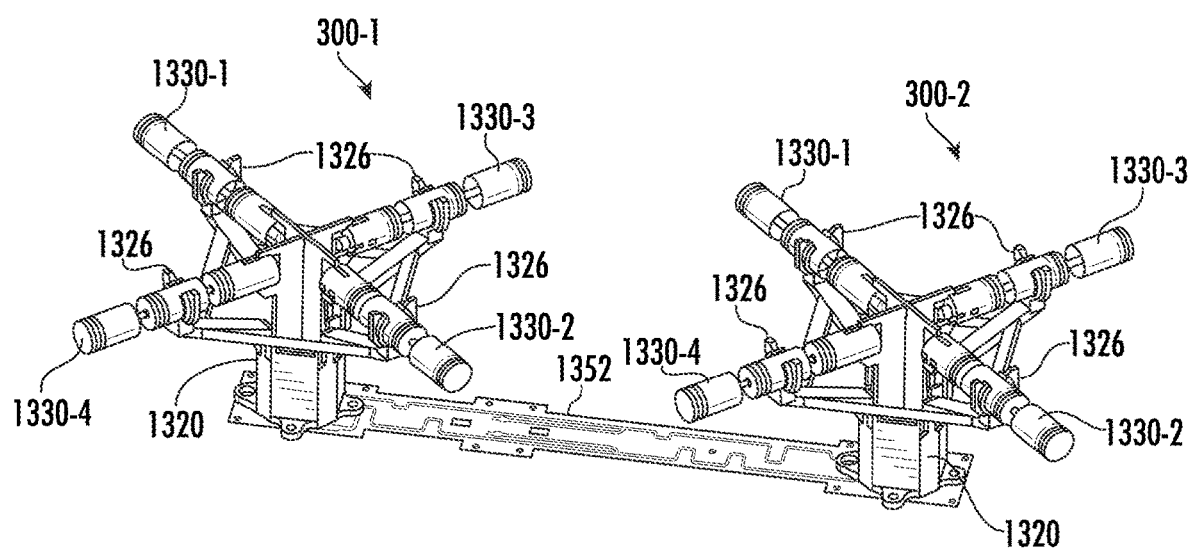

A director 1340 may be mounted on top of each feed stalk 1310 (FIG. 16). The director 1340 may comprise a conductive material and, in some embodiments, may comprise sheet metal. Each director 1340 may be clipped onto its respective feed stalk 1310. The directors 1340 may be used to improve the impedance match of the dipole antenna.

In the methods and apparatuses of assembling the dipole assembly, radiating elements 1330-1 to 1330-4 maybe considered to be the base component and may be loaded into a corresponding fixture 504 on the platform 502 by a loading apparatus 520 in the assembly apparatus of FIGS. 8 and 9. The printed circuit boards 1312-1 and 1312-2 correspond to the printed circuit boards 410-1, 410-2 and may be mounted on the radiating elements as shown and described with respect to the assembly methods and apparatuses of FIGS. 8 and 9 using devices similar to the first and second automated vertical assembly machines 540 and 560, respectively, and the retainers 530, 532. The clips 1327 are vertically inserted into a mating engagement structure on the radiating elements 1330-1 to 1330-4 to connect these components together. The fixture 504, automated vertical assembly machines 540, 560 and loading device 520 and unloading device 600 may be modified to correspond to the size and shape of the dipole assembly components. The support structure 1320 may be vertically mounted over the printed circuit boards 1312-1 and 1312-2 and connected to the radiating elements 1330-1 to 1330-4 using the clips 1326 in an additional assembly step using a third automated vertical assembly machine.

In the assembly methods and apparatuses described with respect to FIGS. 10 through 13, the radiating elements 1330-1 to 1330-4 may be loaded onto the storage device 1580 and the printed circuit boards 1312-1 and 1312-2 assembled as described above with respect to the embodiments of FIGS. 10 through 13. The support structure 1320 may be mounted over the printed circuit boards 1312-1 and 1312-2 and connected to the radiating elements 1330-1 to 1330-4 using the clips 1326 in an additional assembly step performed either before or after the printed circuit boards 1312-1 and 1312-2 are mounted on the radiating elements 1330-1 to 1330-4. The dipole supports 1320 may be secured in place to the printed circuit board 1352 by, for example, rivets or other fasteners that extend through holes in the printed circuit board 1352.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

The invention claimed is:

1. An apparatus for assembling a dipole assembly, comprising:
    a movable conveyor supporting a fixture, the fixture being configured for retaining a radiating element;
    a plurality of work stations spaced about the conveyor, the conveyor being movable to sequentially position the fixture in a work position associated with each of the plurality of work stations;
    a first work station of the plurality of work stations comprising a loading device for loading a radiating element on the fixture;
    a holding device movable with the conveyor;
    a second work station of the plurality of work stations comprising a first automated vertical assembly machine for mounting a first printed circuit board to the radiating element, the holding device aligning and supporting the first printed circuit board relative to the radiating element;
    a third work station of the plurality of work stations comprising a second automated vertical assembly machine for mounting a second printed circuit board to the radiating element to create the dipole assembly, the holding device aligning and supporting the second printed circuit board relative to the radiating element.

2. The apparatus of claim 1, a fourth work station of the plurality of work stations comprising an unloading assembly for removing the dipole assembly from the fixture.

3. The apparatus of claim 2, wherein the movable conveyor comprises a rotating platform supporting three additional fixtures to provide at least four fixtures, each of the four fixtures configured for retaining a radiating element.

4. The apparatus of claim 3 wherein the platform is sequentially rotated about a vertical axis such that the each of the at least four fixtures is positionable at the first, second, third and fourth work stations.

5. The apparatus of claim 2, wherein the unloading assembly comprises a gantry system comprising a first rail extending in the x-direction and supported on uprights so as to be positioned vertically above the conveyor, a first carriage riding on the first rail movable in the x-direction; the first carriage comprising a second rail extending in the y-direction; a second carriage riding on the second rail movable in the y-direction; the second carriage supporting a vertically reciprocating arm movable in the z-direction; and the vertically reciprocating arm supporting the end effector.

6. The apparatus of claim 1, wherein the fixture comprises a recess for retaining the radiating element.

7. The apparatus of claim 1, wherein the loading device comprises a loading arm that unloads the radiating element from a supply and loads the radiating element on the fixture.

8. The apparatus of claim 1, wherein the holding device comprises a first arm and a second arm, wherein the first arm and the second arm move between a first, retracted position and a second, extended position where, in the second, extended position, the first arm and the second arm extend over the fixture and wherein a component holder comprising a pair of retainers is located at the distal end of each of the first arm and the second arm such that the pair of retainers are spaced from one another to create a vertically extending first channel configured to vertically receive the first printed circuit board.

9. The apparatus of claim 8, wherein, in the extended position, the pair of retainers on the first arm are spaced from the pair of retainers on the second arm to create a second vertical channel configured to receive the second printed circuit board.

10. The apparatus of claim 9, wherein the second channel is disposed transversely to the first channel.

11. The apparatus of claim 9, wherein the second automated vertical assembly machine moves the second printed circuit board vertically downward such that the second printed circuit board is inserted into the second channel.

12. The apparatus of claim 11, wherein the second printed circuit board comprises at least one of a third projection and a third slot that engages at least one of a fourth and a fourth projection in the radiating element.

13. The apparatus of claim 8, wherein the first automated vertical assembly machine moves the first printed circuit board vertically downward such that the first printed circuit board is inserted into the first channel.

14. The apparatus of claim 13, wherein the first printed circuit board comprises at least one of a first projection and a first slot that engages at least one of a second slot and a second projection in the radiating element.

15. The apparatus of claim 1, further comprising a soldering work station for soldering the first printed circuit board and the second printed circuit board to the radiating element.

16. The apparatus of claim 1, wherein the first automated vertical assembly machine is in the same orientation as the second automated vertical assembly machine.

17. A method of assembling a dipole assembly, comprising:
    moving a fixture to a work position adjacent a first work station;
    loading a radiating element onto the fixture by a loading device at the first work station;
    moving the fixture to a work position adjacent a second work station;
    mounting a first printed circuit board to the radiating element by a first automated vertical assembly machine at the second work station;
    moving the fixture to a work position adjacent a third work station;
    mounting a second printed circuit board to the radiating element by a second automated vertical assembly machine at the third work station;

unloading the dipole assembly from the fixture by an unloading device.

* * * * *